(12) United States Patent
Ganesan

(10) Patent No.: US 7,792,749 B2
(45) Date of Patent: Sep. 7, 2010

(54) DYNAMIC BILLER LIST GENERATION

(75) Inventor: Rayi Ganesan, Norcross, GA (US)

(73) Assignee: CheckFree Corporation, Norcross, GA (US)

( * ) Notice: Subject to any disclaimer, the term of this patent is extended or adjusted under 35 U.S.C. 154(b) by 2997 days.

(21) Appl. No.: 09/734,694

(22) Filed: Dec. 13, 2000

(65) Prior Publication Data

US 2002/0013768 A1      Jan. 31, 2002

Related U.S. Application Data

(63) Continuation-in-part of application No. 09/298,889, filed on Apr. 26, 1999, now abandoned.

(51) Int. Cl.
*G06Q 40/00* (2006.01)

(52) U.S. Cl. .......................................... 705/40; 705/39

(58) Field of Classification Search ...................... 705/1, 705/40, 42, 35, 39, 44
See application file for complete search history.

(56) References Cited

U.S. PATENT DOCUMENTS

| | | |
|---|---|---|
| 3,852,571 A | 12/1974 | Hall et al. |
| 4,701,601 A | 10/1987 | Francini et al. |
| 4,734,564 A | 3/1988 | Boston et al. |
| 4,734,858 A | 3/1988 | Schlafly |
| 4,747,050 A | 5/1988 | Brachtl et al. |
| 4,775,935 A | 10/1988 | Yourick |
| 4,799,156 A | 1/1989 | Shavit et al. |
| 4,812,628 A | 3/1989 | Boston et al. |
| 4,822,985 A | 4/1989 | Boggan et al. |
| 4,823,264 A | 4/1989 | Deming |
| 4,947,028 A | 8/1990 | Gorog |
| 4,961,142 A | 10/1990 | Elliott et al. |
| 4,977,595 A | 12/1990 | Ohta et al. |
| 4,992,940 A | 2/1991 | Dworkin |
| 5,007,084 A | 4/1991 | Materna et al. |
| 5,021,953 A | 6/1991 | Webber et al. |
| 5,025,373 A | 6/1991 | Keyser, Jr. et al. |

(Continued)

FOREIGN PATENT DOCUMENTS

EP      0542298      5/1993

(Continued)

OTHER PUBLICATIONS

Bielski, Lauren; "EBPP: a flat-lining market shows a pulse. (When Chckfree signed a deal with Bank of America to assume the bank's electronic billpay service this spring, some of the torpor surrounding the electronic bill payment market lifted) (Brief Article)"; ABA Banking Journal, v92, n9; Sep. 2000; pp. 1-7.*

Johnson, H.G.; "Understanding electronic banking"; Price Waterhouse Review, vol. 27, No. 1; 1983; p. 1.*

Business Wire; "TriSense Offers Bank-Controlled Electronic Bill Presentment Solution"; Mar. 25, 1998; pp. 1 and 2.*

(Continued)

*Primary Examiner*—Ella Colbert
(74) *Attorney, Agent, or Firm*—Sutherland Asbill & Brennan LLP

(57) ABSTRACT

A method, system and article of manufacture for processing bill payment information. Information identifying a payee is processed. The information is information identifying a payee to whom a payer intends to electronically direct payment. The processing determines if bills of the payee are available electronically. If the bills of the payee are available electronically, a notice is transmitted to the payer informing the payer that the bills from the payee are available electronically.

60 Claims, 32 Drawing Sheets

U.S. PATENT DOCUMENTS

| | | | |
|---|---|---|---|
| 5,206,488 A | 4/1993 | Teicher |
| 5,220,501 A | 6/1993 | Lawlor et al. |
| 5,255,182 A | 10/1993 | Adams |
| 5,283,829 A | 2/1994 | Anderson |
| 5,287,270 A | 2/1994 | Hardy et al. |
| 5,319,542 A | 6/1994 | King, Jr. et al. |
| 5,325,290 A | 6/1994 | Cauffman et al. |
| 5,326,959 A | 7/1994 | Perazza |
| 5,336,870 A | 8/1994 | Hughes et al. |
| 5,383,113 A | 1/1995 | Kight et al. |
| 5,420,405 A | 5/1995 | Chasek |
| 5,428,684 A | 6/1995 | Akiyama et al. |
| 5,453,601 A | 9/1995 | Rosen |
| 5,455,407 A | 10/1995 | Rosen |
| 5,465,206 A | 11/1995 | Hilt et al. |
| 5,473,143 A | 12/1995 | Vajk et al. |
| 5,477,038 A | 12/1995 | Levine et al. |
| 5,483,445 A | 1/1996 | Pickering |
| 5,500,513 A | 3/1996 | Langhans et al. |
| 5,504,677 A | 4/1996 | Pollin |
| 5,557,516 A | 9/1996 | Hogan |
| 5,557,518 A | 9/1996 | Rosen |
| 5,590,197 A | 12/1996 | Chen et al. |
| 5,613,012 A | 3/1997 | Hoffman et al. |
| 5,649,117 A | 7/1997 | Landry |
| 5,655,089 A | 8/1997 | Bucci |
| 5,677,955 A | 10/1997 | Doggett et al. |
| 5,692,132 A | 11/1997 | Hogan |
| 5,699,528 A | 12/1997 | Hogan |
| 5,710,887 A | 1/1998 | Chelliah et al. |
| 5,710,889 A | 1/1998 | Clark et al. |
| 5,715,314 A | 2/1998 | Payne et al. |
| 5,717,989 A | 2/1998 | Tozzoli et al. |
| 5,724,424 A | 3/1998 | Gifford |
| 5,727,163 A | 3/1998 | Bezos |
| 5,727,249 A | 3/1998 | Pollin |
| 5,729,594 A | 3/1998 | Klingman |
| 5,732,400 A | 3/1998 | Mandler et al. |
| 5,794,221 A | 8/1998 | Egendorf |
| 5,832,460 A | 11/1998 | Bednar et al. |
| 5,870,456 A * | 2/1999 | Rogers ............... 379/91.01 |
| 5,873,072 A | 2/1999 | Kight et al. |
| 5,884,288 A | 3/1999 | Chang et al. |
| 5,920,847 A | 7/1999 | Kolling et al. |
| 5,920,848 A | 7/1999 | Schutzer et al. |
| 5,943,656 A | 8/1999 | Crooks et al. |
| 5,949,043 A | 9/1999 | Hayashida |
| 5,956,700 A | 9/1999 | Landry |
| 5,963,925 A | 10/1999 | Kolling et al. |
| 5,966,698 A | 10/1999 | Pollin |
| 5,970,475 A | 10/1999 | Barnes et al. |
| 5,974,146 A | 10/1999 | Randle et al. |
| 5,978,780 A | 11/1999 | Watson |
| 6,003,762 A | 12/1999 | Hayashida |
| 6,021,491 A | 2/2000 | Renaud |
| 6,029,150 A | 2/2000 | Kravitz |
| 6,032,133 A | 2/2000 | Hilt et al. |
| 6,035,281 A | 3/2000 | Crosskey et al. |
| 6,035,285 A | 3/2000 | Schlect et al. |
| 6,044,362 A | 3/2000 | Neely |
| 6,049,786 A | 4/2000 | Smorodinsky |
| 6,055,513 A | 4/2000 | Katz et al. |
| 6,055,567 A | 4/2000 | Ganesan et al. |
| 6,070,150 A | 5/2000 | Remington et al. |
| 6,078,907 A | 6/2000 | Lamm |
| 6,085,169 A | 7/2000 | Walker et al. |
| 6,098,053 A | 8/2000 | Slater |
| 6,125,349 A | 9/2000 | Maher |
| 6,128,603 A | 10/2000 | Dent et al. |
| 6,173,272 B1 * | 1/2001 | Thomas et al. ............... 705/42 |
| 6,188,994 B1 | 2/2001 | Egendorf |
| 6,195,420 B1 | 2/2001 | Tognazzini |
| 6,208,979 B1 | 3/2001 | Sinclair |
| 6,263,447 B1 | 7/2001 | French et al. |
| 6,285,991 B1 | 9/2001 | Powar |
| 6,289,322 B1 | 9/2001 | Kitchen et al. |
| 6,292,789 B1 | 9/2001 | Schutzer |
| 6,304,857 B1 | 10/2001 | Heindel et al. |
| 6,304,860 B1 * | 10/2001 | Martin et al. ............... 705/43 |
| 6,311,170 B1 | 10/2001 | Embrey |
| 6,317,745 B1 | 11/2001 | Thomas et al. |
| 6,374,229 B1 | 4/2002 | Lowrey et al. |
| 6,493,685 B1 * | 12/2002 | Ensel et al. ............... 705/40 |
| 6,618,708 B1 | 9/2003 | Sakamoto et al. |
| 6,711,682 B1 | 3/2004 | Capps |
| 6,721,716 B1 | 4/2004 | Gross |
| 6,856,974 B1 | 2/2005 | Ganesan et al. |
| 6,889,205 B1 | 5/2005 | Lamm |
| 6,934,691 B1 | 8/2005 | Simpson et al. |
| 6,947,908 B1 | 9/2005 | Slater |
| 6,952,770 B1 | 10/2005 | Mittal et al. |
| 7,107,249 B2 | 9/2006 | Dively et al. |
| 7,158,955 B2 | 1/2007 | Diveley et al. |
| 7,177,830 B2 | 2/2008 | Shields |
| 7,395,243 B1 | 7/2008 | Zielke et al. |
| 2001/0032181 A1 | 10/2001 | Jakstadt et al. |
| 2001/0037295 A1 | 11/2001 | Olsen |
| 2001/0044787 A1 | 11/2001 | Shwartz et al. |
| 2001/0054020 A1 | 12/2001 | Barth et al. |
| 2001/0056390 A1 | 12/2001 | Varadarajan et al. |
| 2002/0002536 A1 | 1/2002 | Braco |
| 2002/0007320 A1 | 1/2002 | Hogan et al. |
| 2002/0013768 A1 | 1/2002 | Ganesan |
| 2002/0019808 A1 | 2/2002 | Sharma |
| 2002/0023055 A1 | 2/2002 | Antognini et al. |
| 2002/0023059 A1 | 2/2002 | Bari et al. |
| 2002/0029248 A1 | 3/2002 | Cook et al. |
| 2002/0029249 A1 | 3/2002 | Campbell et al. |
| 2002/0046168 A1 | 4/2002 | Kitchen et al. |
| 2002/0055850 A1 | 5/2002 | Powell et al. |
| 2002/0059139 A1 | 5/2002 | Evans |
| 2002/0065772 A1 | 5/2002 | Saliba et al. |
| 2002/0069163 A1 | 6/2002 | Gilbert |
| 2002/0069168 A1 | 6/2002 | Lee et al. |
| 2002/0077889 A1 | 6/2002 | Kolls |
| 2002/0095387 A1 | 7/2002 | Sosa et al. |
| 2002/0120563 A1 | 8/2002 | McWilliam et al. |
| 2002/0120628 A1 | 8/2002 | Hitchcock et al. |
| 2002/0165936 A1 | 11/2002 | Alston et al. |
| 2003/0004834 A1 | 1/2003 | Yamazaki |
| 2003/0004867 A1 | 1/2003 | Kight et al. |
| 2003/0036930 A1 | 2/2003 | Matos et al. |
| 2003/0074269 A1 | 4/2003 | Viswanath |
| 2003/0139996 A1 | 7/2003 | D'Antoni et al. |
| 2003/0145018 A1 | 7/2003 | Hitchcock et al. |
| 2003/0167277 A1 | 9/2003 | Hejlsberg et al. |
| 2003/0208441 A1 | 11/2003 | Poplawski et al. |
| 2003/0212642 A1 | 11/2003 | Weller et al. |
| 2004/0064409 A1 | 4/2004 | Kight et al. |
| 2004/0078329 A1 | 4/2004 | Kight et al. |
| 2004/0083167 A1 | 4/2004 | Kight et al. |
| 2004/0083171 A1 | 4/2004 | Kight et al. |
| 2004/0088235 A1 | 5/2004 | Ziekle et al. |
| 2004/0133509 A1 | 7/2004 | McCoy et al. |
| 2004/0133514 A1 | 7/2004 | Zielke et al. |
| 2004/0139005 A1 | 7/2004 | Ganesan |
| 2004/0143548 A1 | 7/2004 | Meier et al. |
| 2004/0167853 A1 | 8/2004 | Sharma |
| 2004/0199574 A1 | 10/2004 | Franco et al. |
| 2004/0236584 A1 | 11/2004 | Kuebert et al. |
| 2005/0010523 A1 | 1/2005 | Myklebust et al. |
| 2005/0033690 A1 | 2/2005 | Antognini et al. |
| 2005/0119971 A1 | 6/2005 | Zito |
| 2005/0154649 A1 | 7/2005 | Jalili |

| | | | |
|---|---|---|---|
| 2005/0197957 A1 | 9/2005 | Keith et al. | |
| 2005/0209965 A1 | 9/2005 | Ganesan | |
| 2005/0222953 A1 | 10/2005 | Ganesan et al. | |
| 2005/0246550 A1 | 11/2005 | Orbke et al. | |
| 2006/0059107 A1 | 3/2006 | Elmore et al. | |
| 2007/0022052 A1 | 1/2007 | Ganesan et al. | |
| 2007/0225999 A1 | 9/2007 | Powell et al. | |

FOREIGN PATENT DOCUMENTS

| | | |
|---|---|---|
| EP | 0745947 A2 * | 4/1996 |
| EP | 0745947 | 12/1996 |
| EP | 1043668 | 11/2000 |
| EP | 1049056 | 11/2000 |
| EP | 1136923 | 9/2001 |
| EP | 1361533 | 11/2003 |
| GB | 2102606 | 2/1983 |
| WO | 91/16691 | 10/1991 |
| WO | 9905628 | 2/1999 |
| WO | 9910823 | 3/1999 |
| WO | 0048103 | 8/2000 |
| WO | 0152142 | 7/2001 |
| WO | 0171973 | 9/2001 |
| WO | 0186558 | 11/2001 |

OTHER PUBLICATIONS

PR Newswire; "CheckFree Names Ravi Ganesan Vice Chairman"; Jun. 20, 2000; pp. 1 and 2.*
Koprowski, Gene; "The money changers: digital cash innovators talk banks, bits, bytes, and bucks. (interviews with Intuit CEO Scott Cook, Digicash CEO David Chaum, Sholom Rosen, vp, Citibank, Federal Reserve Board Gov Larry Lindsey, Rep Mike Castle and U.S. Treasury Dept comptroller Eugene Ludwig)"; Forbes; Aug. 26, 1996; pp. 1-7.*
Corporate EFT Report; Online Banking To Offer Retail, Wholesale Options: Payment Processors, Vans Discuss Connection; Mar. 4, 1998; Repo vol. 18, Issue 4; pp. 1-3.*
Bank Technology News; New Directions: Mar. 1998; pp. 1-11.*
American Banker; Barbara K. Williamson; Transfer Systems, Cash Management to Undergo Changes: Regulatory and Fed Changes Revolutionize Systems; Nov. 19, 1982; pp. 1-4.*
Levine, Shira. "Billing with an Attitude." America's Network, p. 78. (Dialog File 6, 05424287).
Notice of Allowance mailed Mar. 18, 2008 for related U.S. Appl. No. 10/285,662, filed Nov. 1, 2002.
Non-Final Office Action mailed Dec. 13, 2007 for related U.S. Appl. No. 10/285,663, filed Nov. 1, 2002.
Final Office Action mailed Jan. 28, 2008 for related U.S. Appl. No. 10/285,664, filed Nov. 1, 2002.
Final Office Action mailed Jan. 22, 2008 for related U.S. Appl. No. 10/285,691, filed Nov. 1, 2002.
Final Office Action mailed Jan. 10, 2008 for related U.S. Appl. No. 10/285,706, filed Nov. 1, 2002.
Final Office Action mailed Mar. 20, 2008 for related U.S. Appl. No. 10/285,708. filed Nov. 1, 2002.
Final Office Action mailed Nov. 6, 2007 for related U.S. Appl. No. 10/397,836, filed Mar. 27, 2003 which is a continuation-in-part of U.S. Appl. No. 10/285,669, filed Nov. 1, 2002.
Non-Final Office Action mailed Dec. 31, 2007 for related U.S. Appl. No. 10/400,081, filed Mar. 27, 2003 which is a continuation-in-part of U.S. Appl. No. 10/285,706, filed Nov. 1, 2002.
Non-Final Office Action mailed Apr. 3, 2008 for related U.S. Appl. No. 10/879,712, filed Jun. 30, 2004 which is a continuation-in-part of U.S. Appl. No. 10/285,691, filed Nov. 1, 2002.
Disclosure Under 37 C.F.R. 1.56.
Business Task Force of NACHA's Council for Electronic Billing and Payment. "An Overview of Electronic Bill Presentment and Payment Operating Models." Apr. 9, 1999, pp. 1-12.
"CheckFree and Equifax Launch Electronic Billing and Payment—More Than 50 Financial Institutions Rollout Service." PR Newswire, Aug. 25, 1999, p. 1.
Coulter, Cuan. "E-Business: Account Aggregation." Dec. 31, 2001, pp. 1-6.
Council for Electronic Billing and Payment of the National Automated Clearing House Association (NACHA). "Electronic Bill Payment/Presentment Business Practices." Dec. 7, 1999, vol. 2.0.
"European Search Report," European Patent App. No. 04006976, European Patent Office, Mar. 2, 2005.
"European Search Report," European Patent App. No. 04009973, European Patent Office, Sep. 8, 2004.
"European Search Report," European Patent App. No. 04009974, European Patent Office, Oct. 22, 2004.
"European Search Report," European Patent App. No. 04009975, European Patent Office, Oct. 28, 2004.
"European Search Report," European Patent App. No. 04009976, European Patent Office, Nov. 24, 2004.
"European Search Report," European Patent App. No. 04010334, European Patent Office, Feb. 2, 2005.
"European Search Report," European Patent App. No. 04010336, European Patent Office, Feb. 28, 2005.
"Eview Security Overview." AmeriComm website, 2005, pp. 1-2, AmeriComm, Chesapeake, VA. <http://americomm.net/EBPP_ESP.asp?topic=security>.
Fay, D. "An Architecture for Distributed Applications on the Internet: Overview of Microsoft's .NET Platform." Proceedings of the International Parallel and Distributed Processing Symposium, Apr. 22, 2003, pp. 90-96.
"Frequently Asked Questions." Zip Merchant—The Commerce Tools website, 2002, pp. 1-5, CheckFree Corporation, Norcross, GA. <http://www.zipmerchant.com/products/TransactSecure/FAQ/cfm>.
Gralla, Preston. "How the Internet Works." Que, Sep. 7, 2001, 6th ed., pp. 148-151.
"Harris Bill Payment & Presentment Enrollment Help." CheckFree website, 2002, pp. 1-5, CheckFree Corporation, Norcross, GA. <http://www.thevalidnetwork.com>.
"Interactive Financial Exchange." Business Method Specification, IFX Forum, Inc., Jun. 2, 2002, pp. 8-1-8-21.
"Open Financial Exchange Bill Presentment." Open Financial Exchange Specification. Collaborative work of CheckFree Corp., Microsoft Corp. and Intuit, Inc., Jun. 12, 1997, pp. 312-356.
Osberg, Sharon. "Wells Fargo, Standards-based Electronic Bill Presentment and Payment (EBPP)." Sun Microsystems, Nov. 1999.
"Microsoft Tries for Lead in Billing." Phillips Business Information, Feb. 27, 1998, vol. 3, issue 4, pp. 1-3.
Non-Final Office Action mailed May 29, 2008 for U.S. Appl. No. 11/139,627, filed May 31, 2005 which is a divisional of U.S. Appl. No. 09/734,694.
Non-Final Office Action mailed Jul. 20, 2009 for U.S. Appl. No. 11/139,627, filed May 31, 2005 which is a divisional of U.S. Appl. No. 09/734,694.
Non-Final Office Action mailed Aug. 13, 2008 for U.S. Appl. No. 10/285,706, filed Nov. 1, 2002.
Final Office Action mailed Oct. 6, 2008 for U.S. Patent Application No. 10/879,712, filed Jun. 30, 2004 which is a continuation-in-part of U.S. Appl. No. 10/285,691.
Notice of Allowance mailed Dec. 9, 2008 for U.S. Appl. No. 10/285,706, filed Nov. 1, 2002.
Non-Final Office Action mailed Feb. 20, 2009 for U.S. Appl. No. 10/879,712, filed Jun. 30, 2004 which is a continuation-in-part of U.S. Appl. No. 10/285,691.
Non-Final Office Action mailed Jul. 9, 2009 for U.S. Appl. No. 10/397,834, filed Mar. 27, 2003 which is a continuation-in-part of U.S. Appl. No. 10/285,706.
Non-Final Office Action mailed Sep. 2, 2009 for U.S. Appl. No. 10/879,712, filed Jun. 30, 2004 which is a continuation-in-part of U.S. Appl. No. 10/285,691.
Non-Final Office Action mailed Dec. 24, 2009 for U.S. Appl. No. 10/397,834, filed Mar. 27, 2003 which is a continuation-in-part of U.S. Appl. No. 10/285,706.
Notice of Allowance mailed Jan. 26, 2010 for U.S. Appl. No. 10/879,712, filed Jun. 30, 2004 which is a continuation-in-part of U.S. Appl. No. 10/285,691.
Final Office Action mailed Feb. 5, 2010 for U.S. Appl. No. 11/139,627, filed May 31, 2005 which is a divisional of U.S. Appl. No. 09/734,694.

* cited by examiner

| Payee/Payer Identifies | Reg | FI Identifier | Billing Information | Remittance Information |
|---|---|---|---|---|
| A | Y | I PA DA | YES | YES |
| B | Y | J PA | NO | NO |
| C | Y | K PA DA | YES | NO |
| D | N | UNKNOWN | YES | NO |
| E | Y | L DA PA | NO | YES |
| F | N | UNKNOWN | NO | YES |
| G | N | UNKNOWN | YES | YES |
| H | Y | K PA DA | YES | YES |
| I | Y | I PA DA | YES | YES |
| J | Y | J PA DA | YES | YES |
| K | Y | K PA DA | YES | YES |
| L | Y | L PA DA | YES | YES |
| n ↓ | ↓ | ↓ | ↓ | ↓ |

| Registered User/Biller Identifiers | Billing Information |
|---|---|
| User A | Yes |
| User E | Yes |
| User H | Yes |
| User I | Yes |
| User J | Yes |
| User K | Yes |
| User L | Yes |
|  |  |
|  |  |
| n | n |

FIG. 9

| Unregistered User/Customer Identifiers (1305) | Billing Information (1310) |
|---|---|
| User D | Yes |
| User G | Yes |
| ↓ | ↓ |
| n | n |

FIG. 13

| 1501 | 1502 | 1503 | 1504 | 1505 | 1506 | 1507 |
|---|---|---|---|---|---|---|
| Payee Identifier | Street Address | City | State | Zip Code | Payee Phone Number | Consumer Account Number |
| Payee 1 | 1216 Morning Glory | Bridgeport | CO | 11112-2222 | (555) 555-0000 | 55897B7-4A |
| Payee 2 | 1311 1st Street | Central City | CA | 00000-0001 | (555) 555-5568 | 4586-58C-433 |
| Payee 3 | 748 Elm Place | Townson | OR | 00200-1256 | (555) 555-7896 | None |
| Payee 4 | 7868 Business Rd. | Dallas | TX | 00620-8989 | (555) 555-0004 | 585DB-7 |

FIG. 15

| Payee Identifier | Street Address | City | State | Zip Code | Payee Phone Number | Users |
|---|---|---|---|---|---|---|
| Payee 1 | 1216 Morning Glory | Bridgeport | CO | 11112-2222 | (555) 555-0000 | A, B, H |
| Payee 2 | 1311 1st Street | Central City | CA | 00000-0001 | (555) 555-5568 | B, C |
| Payee 3 | 748 Elm Place | Townson | OR | 00200-1256 | (555) 555-7896 | B |
| Payee 4 | 7868 Business Rd. | Dallas | TX | 00620-8989 | (555) 555-0004 | B, E |
| Payee 5 | 55 Hurst | Topeka | KY | 002588-4444 | (555) 555-4444 | B |
| n | n | n | n | n | n | n |

DYNAMIC BILLER LIST GENERATION

RELATED APPLICATIONS

This application is a continuation-in-part of U.S. patent application Ser. No. 09/298,889, filed Apr. 26, 1999 now abandoned, and entitled Electronic Bill Presentment and/or Payment Clearinghouse.

TECHNICAL FIELD

The present invention relates generally to electronic bill presentment and/or payment. More specifically, the present invention relates to notifying users of the availability of electronic bill information.

BACKGROUND ART

Over the past several years an international network of networks known as the Internet has become increasingly popular. The Internet allows millions of users throughout the world to communicate with each other. To provide users with easier access to information available on the Internet, a World Wide Web has been established. The World Wide Web allows information to be organized, searched and presented on the Internet using hypertext. Thus, using the World Wide Web a user can submit a query for information and be linked electronically to information of interest which has been stored at web locations on the Internet. Using hypertext, a user can also communicate information to other users of the Internet. Hence, the Web has made it relatively easy for virtually anyone having access to a personal computer or other device connected to the Internet to communicate with others who are also connected to the internet.

With the proliferation of Internet users, numerous services are now provided over the Internet. One of the first such services to be offered was electronic banking. Electronic banking allows banking customers to access their account information and execute banking transactions, e.g. the transfer of funds from a savings to checking account, by simply linking to a bank server using the Internet to access account information and communicate transfer instructions.

More recently, it has become possible to electronically pay bills by communicating instructions, via the Internet, to a financial institute maintaining deposited or credited funds of a pre-registered payer, or to a representative of the financial institute. The payments are then made to the payee by the financial institute or its representative. Funds from the payer's deposit or credit account, i.e. the payer's account, are debited by the financial institute to cover the payment. The payment by the financial institute or its representative to the payee can be made in any number of ways.

For example, the financial institute or representative may electronically transfer funds from the payer's account to the payee's account, may electronically transfer funds from a financial institute/representative's deposit or credit account, to the payee's account, may prepare a paper draft on the financial institute/representative account and mail it to the payee, may prepare an electronically printed paper check on the payer's account and mail it to the payee, or may make a wire transfer from either the financial institute/representative account or payer's account.

If the funds transferred to the payee are drawn from the financial institute/representative account, funds from the payer's account are electronically or otherwise transferred by the financial institute to the financial institute/representative account to cover the payment. Further, if the payment will be made from funds in the financial institute/representative account, the payment will preferably be consolidated with payments being made to the same payee on behalf of other payers.

Accordingly, such electronic bill payment systems eliminate the need for a payer to write or print paper checks and then forward them by mail to the payee. This makes it easier and more efficient for the payer to make payments. Payees receiving consolidated payments no longer have to deal with checks from each payee and therefore can process payments more efficiently. The making of payments by the electronic or wire transfer of funds provides even further efficiencies in payment processing by payees, and it is well recognized that making payments electronically can significantly reduce the cost of processing payments for both the payer and payee.

The number of users of electronic bill payment services has grown dramatically since introduction by CheckFree Corporation, the assignee of the present application. However, because the billing side of the billing/payment process had not been integrated with the electronic payment process, many potential users remained reluctant to utilize the service.

More particularly, until the offering by CheckFree Corporation, electronic bill payment systems were operated independent of the bill presentment process. Still today, most conventional electronic bill payment systems generally require that the payee receive a conventional paper bill from a merchant or other billing entity, the exception being for certain bill payments, such as mortgage payments, which can be pre-authorized by the payee. Thus, for most bill payments, it is only after the paper bill has been received that the payee can connect to the electronic bill payment system via the Internet and provide a payment instruction.

Using CheckFree's fully integrated electronic bill presentment and payment system, registered merchants and other payers can electronically present bills to registered consumers and other payees by communicating bills via the Internet, to the electronic presentment/payment service provider, which could be a financial institute/representative or some other service provider. Typically, the bill is stored centrally on the electronic presentment/payment system server. The service provider notifies the payer, for example by Internet email, of the availability of the bill and the bill can then be accessed by the payer by connecting to the system server or some other server, via the Internet, to retrieve the bill. Once connected to the system server, the payer can also communicate a payment instruction to the server and the payment can then be made to the payee as previously described.

Accordingly, CheckFree's electronic bill presentment and payment system eliminates the need for a payee to print paper bills and then forward them by mail to the payer. This makes it easier and more efficient for the payee to issue bills. Payers receiving electronic bills no longer have to deal with paper bills from each payer. The combination of electronic presentment and payment of bills has provided even further efficiencies and cost reductions in billing and payment processing by both payers and payees.

Although electronic bill presentment and particularly integrated electronic bill presentment and payment have received broad user acceptance from both payers and payees, there remains a significant number of payers using electronic bill presentiment and payment services who are not taking full advantage of the benefits of the electronic bill presentment facet of the services. These payers may not electronically receive all of their bills which are available in the electronic presentment form. Instead, these payers continue to receive some bills in paper form and make payments in either electronic or paper form. Oftentimes this is because the electronic payers are unaware that a particular payee offers electronic presentment.

One reason a payer may be unaware of the availability of electronic bills from a particular payee is that the community of payees who offer electronic bill presentment is ever-growing. These new-to-electronic-bill-presentment payees often have not informed their customers in a timely manner that electronic bill presentment is available. There is also a segment of the users of integrated electronic bill payment and presentment services who are unaware that any of their payees offer electronic bill presentment.

Accordingly, a need exists for a technique to inform bill presentment and payment service users that electronic bill presentment is available, whether these customers are already taking advantage of electronic bill presentment to some extent, or whether they simply use the payment side of the service, to increase usage of electronic bill presentment.

As described above, electronic bill presentment offers significant benefits to payees. However, to gain these benefits, a payee who offers electronic bill presentment must be able to identify those payers who might wish to utilize electronic bill presentment. Currently, the only way for payees to identify a payer for electronic bill presentment is to receive a request for electronic bill presentment from that payer. The payee might also identify a payer for electronic bill presentment based on knowledge that a payer currently makes payments electronically to that payee.

By being able to identify consumers who utilize electronic bill presentment and payment services for purposes unrelated to receiving or paying a payee's bill, a payee could efficiently focus its efforts to recruit new payers into the payee's electronic bill presentment and payment community of users. Accordingly, a need exists for a technique which will allow electronic billers to identify payers who may be amenable to electronic bill presentment and/or payment, to increase usage of electronic bill presentment and/or payment.

OBJECTIVES OF THE INVENTION

It is accordingly an objective of the present invention to provide a technique which will facilitate increased usage of electronic bill presentment.

Additional objects, advantages, novel features of the present invention will become apparent to those skilled in the art from this disclosure, including the following detailed description, as well as by practice of the invention. While the invention is described below with reference to preferred embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

SUMMARY DISCLOSURE OF THE INVENTION

The present invention provides a system and method for processing bill payment information. The system includes at least one processor, a memory for storing data, and a communications port for transmitting and receiving information, including bill payment information. The processor may be any type processor, such as a personal computer, high powered workstation, or sophisticated main-frame processor. The memory also may be a type of memory capable of storing data, including random access memory, floppy or hard magnetic disk, or optical disk. Data stored in the memory and data processed by the processor are exchanged between the processor and the memory. The data can include bill payment information and operating instructions for controlling the operations of the processor. The communications port may be connected to a network configured to transmit electronic or optical data. The network can include a public or private telephone network, the Internet, or any other type network. Bill payment information can include directions to pay a bill, information identifying payers, payees, billers, customers, financial institutions, and/or data representing accounts maintained at financial institutions. The bill payment information could also, or alternatively, include information identifying parties to financial transactions that may or may not take place in the future.

In accordance with the invention, the processor processes information identifying a payee to whom a payer intends to electronically direct payment. This identifying information may be information stored in the memory, it may be information received via the communications port, or it may be information received by the processor in some other manner. The information may be information received from the payer and processed prior to storage in the memory, or it may be processed subsequent to storage in the memory. The information could, if desired, be received, processed in a manner unrelated to bill payment, stored, and then retrieved and processed again. The information identifying the payee could be, but preferably is not, associated with a directive to make a payment to that payee.

The processor processes the information to determine if bills of the payee are available electronically. That is, are bills issued by the payee, also sometimes referred to as a biller, available in electronic format as opposed to a traditional format in which bills are presented on paper to a payee, also sometimes referred to as a customer.

If the processor determines that bills issued by the identified payee are available electronically, i.e. are either already available in electronic form or could be made available in electronic form, the processor directs that a notice be transmitted to the payer notifying the payer that the bills of the payee are available electronically. This notice may be transmitted via any network of computers, any telephone network, or even via traditional mail.

Beneficially, the processor directs that information identifying the payee be transmitted to the payer along with notice that bills from this payee are available electronically.

Advantageously, the system also can include several different databases stored in the memory. For example, a database for storing information identifying a payee to whom a payer intends to electronically make payment may be stored. This database is referred to as a payee pick-list. The payee pick-list database can include information identifying more than one payee. As discussed above, the information identifying the payee may be processed either after storage, which could, in this case be storage in the payee pick-list database, or prior to storage in the payee pick-list database.

Preferably, the memory stores a plurality of payee pick-lists. Each of the payee pick-lists is associated with a different payer. Each payee pick-list can also include information indicating which of the included payees offers electronic bill presentment, as well as the availability of electronic bill information.

In accordance with a particularly preferred aspect of the invention, the information identifying the payee may be processed by the processor more than once. If initial processing determines that the bills of the payee are not available electronically, the processor will subsequently process the information again. If this subsequent processing determines that the bills of the payee are available electronically, the payer is then informed as discussed above. This subsequent processing may be performed periodically or based on a triggering event so that information regarding availability is updated routinely.

Another of the databases which may be stored in the memory is a database storing information identifying payees that offer electronic bill presentment. The processor can be configured to access this database to determine if a payee is included in this database.

Yet another of the databases which may be stored in the memory is a database storing information identifying payees that have presented one or more electronic bills. This database is sometimes referred to as a biller database. The processor can be configured to access this database and determine if a payee is included in this database.

Still another of the databases which may be stored in the memory is a database storing electronic billing information. The electronic billing information may relate to payers who have paid a bill electronically, payers who have received a bill electronically, payees who have presented a bill electronically, payees who presently present bills electronically, stored electronic bills, and may include other information associated with a bill. The processor can be configured to access this database and determine if information associated with a payee is included in this database. Preferably, the processor is also configured to access this database and determine if a stored electronic bill for a payer and associated with the payee is stored in the database. If so, the processor directs a further notice be transmitted to the payer notifying the payer that the stored electronic bill is available.

In another beneficial aspect of the invention, a processor, such as a user computer, can be configured to receive, responsive to the transmitted notice, an inputted request from the payer to receive the bills of the payee electronically. If desired, the processor can, responsive to receipt of the inputted request, cause the request to be transmitted to the payee via, for example, a hyper-link, batch transfer or other communication.

Still another of the databases which may be stored in the memory is a database storing information identifying payers having stored electronic bills in the database storing electronic billing information. This database is sometimes referred to as a customer database. The processor may be configured to access this database to determine if a payer is included in this database before accessing the database storing electronic billing information to determine if a stored electronic bill for the payer and associated with a payee is stored in that database. If the payer is not included in the customer database, the processor need not access the database storing electronic billing information.

Preferably, the processor is also configured to receive an electronic bill, which could be in the form of full or summary bill information in any format, from a payee directed to a payer. The processor processes this electronic bill to determine if the payee is included in the database storing information identifying those payees having presented at least one electronic bill, discussed above and referred to as the biller database. If not, information identifying the payee is added to this database.

If information identifying the payee is not included in the biller database, then an indication that the payee offers electronic bill presentment will not be stored in any payee pick-list. Beneficially, to keep each pick-list current, if the payee is not included in the biller database the processor can be configured to identify the payee pick-lists in which the payee is identified and store information identifying the payee as a payee offering electronic bill presentment in each of the identified payee pick-lists.

Another of the databases that can be stored in the memory is sometimes referred to as a master payee pick-list. The master payee pick-list includes information identifying every payee included in each of the individual payee pick-lists for each payer. The master payee pick-list may also include information identifying each payer having identified a payee in an individual payee pick-list. In which case, each payee is associated with each respective identified payer.

The processor is optionally configured to access the master payee pick-list and to determine, if the payee is not included in the biller database, if that payee is included in the master payee pick-list. If so, the processor determines which of the payers are associated with the payee. The processor then stores information identifying the payee as a payee that offers electronic bill presentment in each individual payee pick-list associated with an identified payer.

The processor may additionally be configured to store a received electronic bill. Beneficially, the processor can also be configured to transmit a notice to a payer that the electronic bill is available. As with the above-discussed notice, the transmission may take on any of several forms.

In accordance with another particularly preferable aspect of the invention, the processor is configured to determine if a payer is associated with an individual payee pick-list. If so, the processor can determine if a payee is included in that payer's individual payee-pick list. And, if so, the processor stores an indication of available electronic billing information from the payee in that payer's individual payee pick-list. This processing ensures that the payee's individual payee pick-list is kept current as to availability of any stored electronic billing information.

To keep the customer database current, the processor may be configured to access the customer database and determine if a payer is included. If not, information identifying the payer can be stored in the customer database.

The processor may also be configured to determine if a payee is included in the master payee pick-list, even if the payee is included in the biller database. If a payee is included in the master payee pick-list, the processor can determine if a payer is associated with that payee in the master payee pick-list. If so, the processor stores an indication of available electronic billing information from that payee in that payer's individual payee pick-list.

In another embodiment of the invention, computer programming is stored on a computer readable medium. The computer readable medium is readable by a computer to cause the computer to operate as discussed above. That is, the programming stored on the computer readable medium causes a computer to perform each desired aspect of the invention discussed above.

In another aspect of the invention, information is received which identifies a person, a deposit account associated with the person, and a financial institution at which the deposit account is maintained. Information identifying the person need never have been received before. Electronic billing information is stored in a first database. Other information identifying unregistered persons having electronic billing information stored in the first database is stored in a second database. A determination is made as to whether the other information stored in the second database identifies the person. If so, the person is notified of the availability of stored electronic billing information which identifies the person. Thus, a person who is unregistered can be notified of stored billing information immediately upon becoming registered.

In yet another aspect of the invention, a method for notifying a payer of the availability of electronic bill presentment is disclosed. An instruction to pay a bill of a payee is received via a network. A database is accessed which contains information identifying payees who offer electronic bill presentment. A determination is made as to whether the payee is included in the database. If so, the payer is notified that the payee offers electronic bill presentment.

Advantageously, a request to receive electronic bills from the payee is received from the payer. The payee is notified that the payer requests to receive the electronic bills. The notification to the payer may be via a hyper-link, batch transfer or other communication. Beneficially, electronic bill presentment options may be transmitted to the payer. A request from the payer is input to select one of the options. This inputted request is transmitted to the payee.

Another database may be accessed which stores information identifying stored electronic billing information. If it is determined that electronic billing information for the payer is stored in this other database, the payee is notified of the availability of the stored electronic billing information. A request from the payer to access the stored information may be entered by the payer. A hyper-link can be activated responsive to receipt of the request and the stored information may be transmitted to the payer via the hyper-link.

BRIEF DESCRIPTION OF DRAWINGS

FIG. 8 is a simplified depiction of a central database for storing electronic billing and remittance information, in accordance with the present invention.

FIG. 9 is a simplified depiction of a registered user/biller database for storing a list of registered users who are electronic billers, in accordance with the present invention.

FIG. 13 is a simplified depiction of an unregistered user/customer database for storing a list of unregistered users who are customers, in accordance with the present invention.

FIG. 15 is a simplified depiction of an individual payee pick-list for storing information identifying payees a user may plan to pay electronically.

FIG. 27 is a simplified depiction of a master payee pick-list for storing information identifying every payee identified by at least one user for inclusion in an individual user's payee pick-list.

BEST MODE FOR CARRYING OUT THE INVENTION

Figure 1:
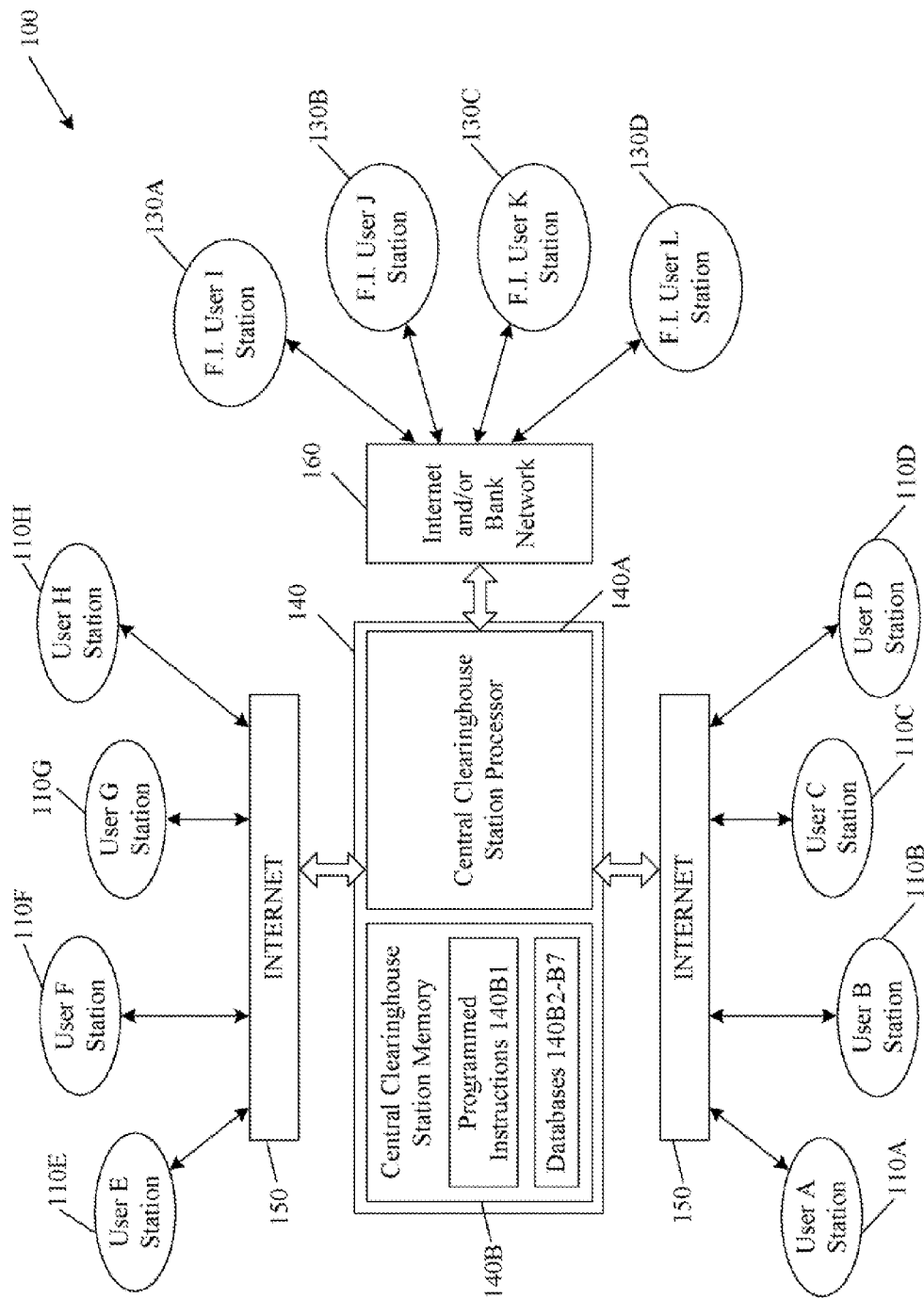
FIG. 1 depicts an electronic bill presentation and payment network in accordance with the present invention.

As shown in FIG. 1, a bill presentment and payment network 100 includes a large number of user stations represented as payee and payer user stations 110A-110H, respectively representing payees and payers A-H. It will be recognized that the network 100 preferably includes many thousands if not millions of user stations. The user stations are capable of communicating via the Internet 150, although it will be understood that some other communications network could be utilized in lieu of the Internet.

Also included in the network 100 are a large number of financial institute (FI) user stations 130A-130D, respectively representing financial institutes I-L. The FI stations 130A-130D are capable of connecting to a communications network 160 which could be the Internet and/or a more secure communications network such as the conventional ACH communications network or some other inter-bank communications network. Additionally included in the network 100 is a central clearinghouse station 140. Station 140 includes a processor 140A and memory 140B. The memory 140B stores databases 140B3-140B5 for storing user-class information, as will be discussed below, databases 140B6 and 140B7 for storing payee information, as will be discussed below, and programmed instructions 140B1. The memory 140B also stores a relational database 140B2 for storing billing and remittance information. Each user A-H has a deposit and/or payment account, each to be called an account herein, maintained at one of the financial institutes I-L.

Although, as shown, each of the user stations 110A-110H can communicate with the central clearinghouse station 140 via the Internet 150, for purposes of the following description, only certain of users A-H are registered to electronically present and/or pay bills on network 150, see FIGS. 8, 9, 11 and 13. More particularly, for purposes of the following discussion, users D, F and G are unregistered users of network 100. Further, user A is an individual and users B and H are small business entities. User E is a large business entity.

To facilitate the use of the electronic bill presentment and payment services, the central clearinghouse station 140 operates in accordance with instructions 140B1, to perform a registration process. For some users, the registration process may require only that the user provide its identification, its account number and an identification of a financial institute at which its account is maintained. In any event, this information is stored in the relational database 140B2 in association with a user identifier and an identifier indicating that the user is a registered user. Having this information, the central clearinghouse station processor 140A can now direct payments, preferably by electronic fund transfer, to the account of a registered user. The central clearinghouse station processor 140A can also now directs payments, preferably by electronic fund transfer, from the account of a registered user to make a payment directed by that registered user.

The central clearinghouse station processor 140A also operates to generate remittance information for each payment directed to a user, registered or unregistered, as will be further described below, and to direct the storage of such information in the relational databases 140B2 in association with the user identifier. Thus, the database 140B2 serves as a temporary depository for remittance information corresponding to any payment directed to a user on behalf of registered network users.

To central clearinghouse station 140, individuals, small businesses, and large businesses appear the same. The central processor 140A also functions to generate user-class information for each bill received from a registered user for electronic presentment, as will be discussed below.

The central processor 140A also operates to generate billing information for each bill, whether including full or summary information, received from a registered user for payment by another user and to direct the storage of such information in the relational database 140B2 in association with the other user's identifier. Thus, the relational database 140B2 serves as a temporary depository for billing information which may be provided by any of the registered users. Registered users who provide electronic bills for payment by other users are also known as billers. Users to whom received electronic bills are directed are also known as customers.

The central processor 140A preferably further functions to electronically receive bills from registered billers in the form output by any commonly used standard invoicing software packages, such as Quickbooks, Peachtree and other off-the-shelf invoicing software, or alternatively in ASCII or other formats and, if necessary, to convert the received bill into standard format billing information for storage in the database 140B2 in relationship with the applicable customer identifier for subsequent presentment to the applicable user station 10A-H. Accordingly, registered billers need not modify their existing invoicing software or substantially modify their existing procedures, other than to transmit the bill output from their existing invoicing software via the Internet 150 to the central clearinghouse station 140, to have their bills electronically presented to the applicable customer.

The central clearinghouse station processor 140A is also preferably capable of generating remittance information in multiple standard formats, compatible with all the commonly used accounts receivable or invoicing software, and in ASCII or other formats. The central processor 140A directs the storage of the formatted remittance information in the database 140B2 of memory 140B in association with the applicable user identifier. The remittance information can be generated and stored in all the above mentioned formats. Alternatively, the applicable biller can select, or otherwise identify, a particular one of the formats in which it wishes to receive remittance information. Using this later alternative, the remittance information is formatted and stored only in the requested format. Accordingly, registered billers can obtain remittance advice by simply using a browser to contact the central clearinghouse station 140 and requesting the stored remittance information. Responsive to the request, the central clearinghouse station processor 140A retrieves the applicable remittance information from the database 140B2 and transmits the information via the Internet 150 to the applicable user station. Because the information will typically be received in at least one format usable by the biller's standard invoicing software, this information can be directly input to the accounts receivable system and processed in the conventional manner.

Figure 2:
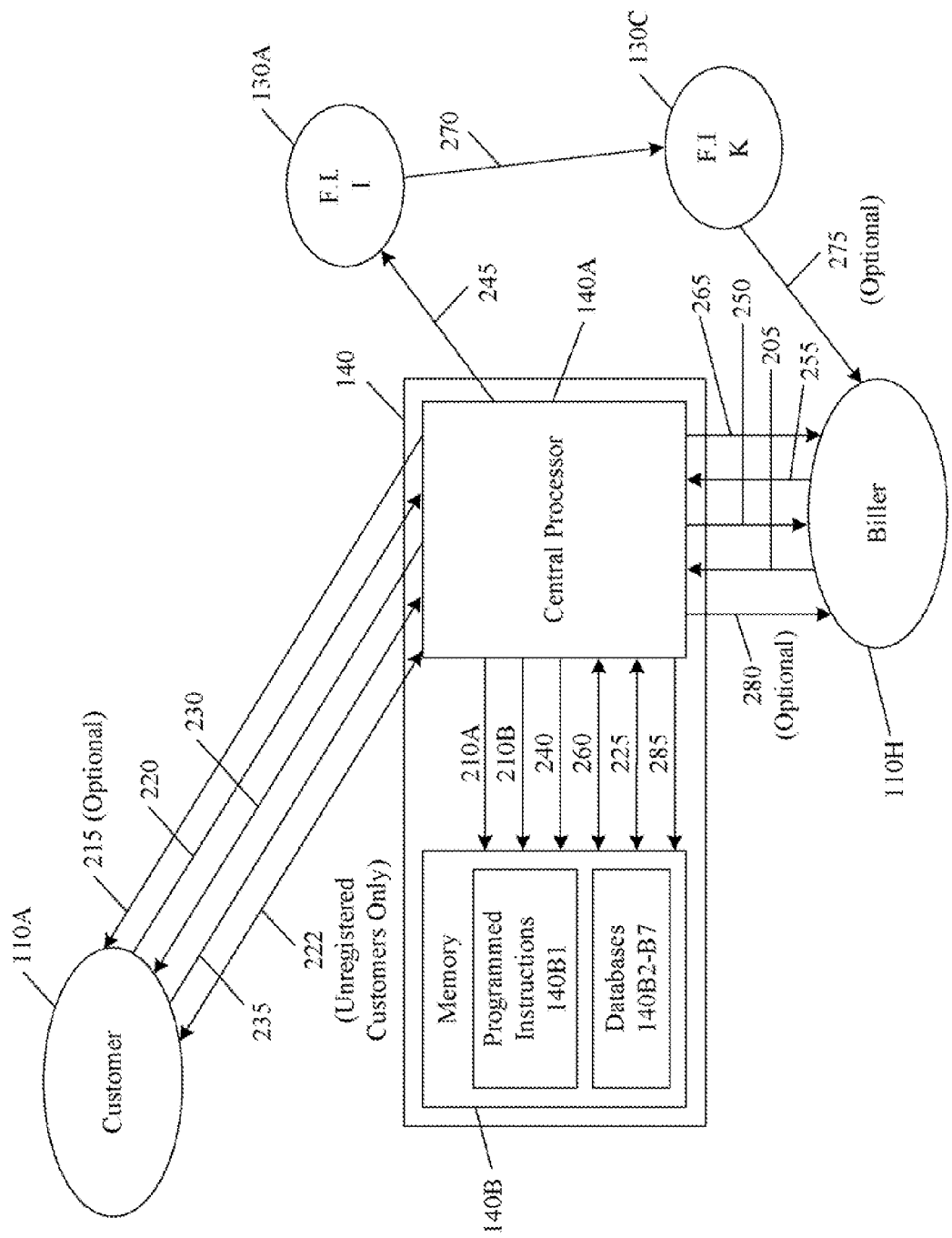
FIG. 2 depicts the communications between various network stations depicted in FIG. 1, in accordance with the present invention.
Figure 3:
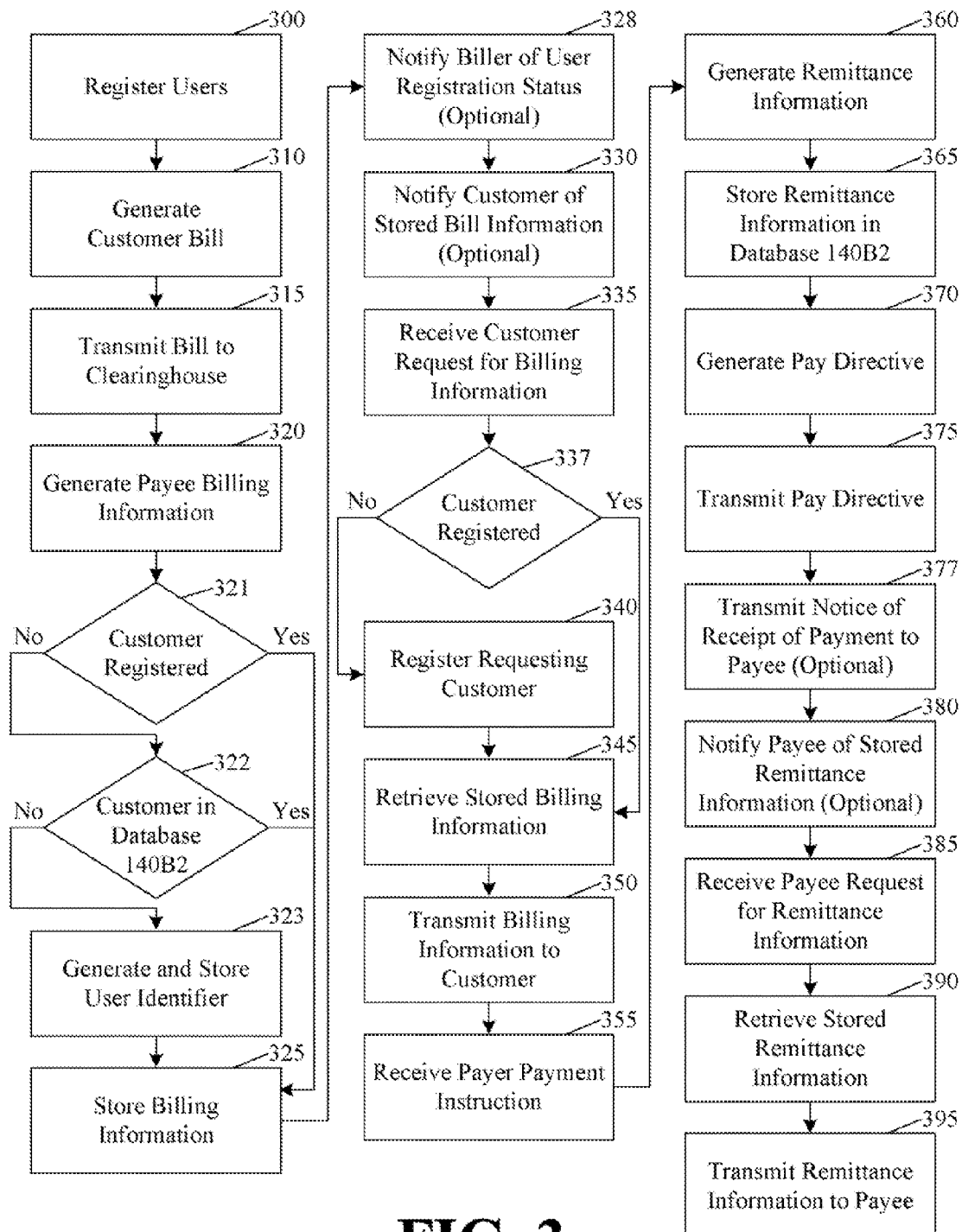
FIG. 3 is a flow chart showing the operations which are performed by the network stations of FIG. 2, in accordance with the present invention.

FIG. 2 depicts the communications between various network stations to electronically present and pay bills. Turning to FIGS. 2 and 3, user A and user H are registered in step 300 of FIG. 3. User H, who is also a biller and represented by user station 110H, generates, in step 310 in FIG. 3, a bill to user A, represented by station 110A. The bill may be generated by a standard software package or otherwise. The output of the software, which represents the bill, is transmitted in communication 205 from the user station 110H to the central clearinghouse station 140, as indicated in step 315 of FIG. 3. The central clearinghouse station processor 140A, in accordance with programmed instructions 140B1, processes the received bill to generate standard format billing information in step 320.

The central processor 140A also determines if user A is a registered user, as indicated in step 321. If so, as is the case here, the central processor 140A, in communication 210A, directs the storage of the billing information in the relational database 140B2 of the memory 140B in association with the user A identifier, as shown in step 325.

Additionally, central processor 140A may optionally generate and transmit a notification to user station 110H notifying user station 110H of the registration status of user A, as indicated by communication 280 and step 328. Biller H may then inform the customer, perhaps in correspondence enclosed with a paper copy of the bill mailed to user A, that billing and/or payment is available electronically, thereby motivating the registered user to utilize electronic bill payment and/or presentment.

The central processor 140A may also optionally generate and transmit a notification to the user station 110A of the availability of stored billing information, as indicated by communication 215 and step 330, if the user to whom the bill is directed is a registered user.

If the bill were for unregistered user D rather than registered user A, central processor 140A determines if a user D identifier is stored in database 140B2 at step 322. If unregistered user D has previously been paid by a registered user, or if a registered user has submitted an electronic bill for payment by user D, an identifier for user D will already be stored in database 140B2. If so, operations continue with step 325. If not, a user D identifier is generated based upon the billing information and stored in database 140B2, as indicated by communication 285 and step 323. Next, the generated billing information is stored in the database 140B2 in association with the user identifier, as indicated by communication 210B and step 325. Thus, after completion of step 323, operation continue as described above and depicted beginning at step 325.

A request for the billing information, as indicated in step 335, is received via communication 220 at the central clearinghouse station 140 from station 110A. The central processor 140A determines whether or not the request is from a registered user in step 337. If the request were from unregistered user D rather than registered user A, the central processor 140A would transmit a query to station 110D, as shown in FIG. 1, to determine if user D desires to register and thereby obtain access to its billing information which is stored on database 140B2. Optionally, an unregistered customer could be provided with limited access to its stored electronic billing information to sample electronic bill presentment based upon providing sufficient information to verify the customer's identity, but without the need to provide an account number and associated financial institute information.

Thus, it should be understood that the central clearinghouse station 140 operates to generate and direct the storage of billing information in association with registered and unregistered user identifiers, as may be desired by a registered user. If billing information for an unregistered user is stored in database 140B2, the biller may inform the unregistered customer, perhaps in correspondence enclosed with a paper copy of the bill mailed to the unregistered user, that the bill is available and payable electronically and can be accessed by contacting the central clearinghouse station 140 at its Internet web site, thereby motivating the unregistered user to register for electronic bill presentment and/or payment services. Preferably, the non-registered requesting user is registered via communications 222 in step 340. It will of course be noted that although communications 222 are shown in FIG. 2 for completeness, since user A has pre-registered, these communication would not actually occur with station 110A but would be required, for example, with station 110D in order to register user D.

As indicated in step 345, the central processor 140A retrieves the applicable billing information from the database 140B2 of memory 140B responsive to the access request from station 110A, as indicated by communication 225. The retrieved information is then communicated by the station 140, as directed by central processor 140A, to the user station 110A via communication 230, as indicated in step 350. In step 355, the central processor 140A receives a payment instruction via communication 235 from the user station 110A. Based upon the instruction, the central processor 140A generates remittance information in step 360 and directs the storage of the remittance information in the database 140B2 of memory 140B in association with the user H identifier via the communication 240, as indicated in step 365. Remittance information may include such information as the name of the payer, the payer's address, phone number, and account number with the payee, among other information. Generated and stored remittance information is particularly beneficial in those situations in which the central station 140 stores bill information for an unregistered user who becomes registered and electronically pays the bill represented by the stored bill information. The remittance information informs the biller that the bill has been paid and that the customer is now a registered user.

The central processor 140A also generates a pay directive in step 370. In step 375, the generated pay directive is transmitted.

discussed above, payment may be accomplished in various ways. However, preferably the directive is to the financial institute I, represented by station 130A, which maintains an account for the user A. The directive is transmitted via communication 245 to the FI station 130A and the payment funds are transferred electronically in communication 270, for deposit in the user H account maintained at financial institute K, represented by FI station 130C. Of course, the payment directive may not be electronic, it may be a paper directive, such as a draft or check.

And, the payment directive, whether electronic or paper, may direct that funds from the payer's account be transferred to, electronically or otherwise, an account associated with the central clearinghouse station 140. The financial institute K may, if desired, notify user H via communication 275 to station 110H, of the receipt of the deposit, as indicated in step 377. It should be understood that the generation and storage of the remittance information and the generation and/or transmission of the pay directive may occur substantially simultaneously or at different times, as will be described further below.

Optionally, although not preferably, an email or other notice is sent via communication 250 to the user station 110H, to notify the user of the availability of the stored remittance information, as indicated in step 380. In step 385, a request for remittance information is transmitted in communication 255 from the user station 110H and received by the central station 140. Communications 260, between central clearinghouse processor 140A and memory 140B, result in the retrieval of the remittance information from the database 140B2 in response to the request, as indicated in step 390. The retrieved information is transmitted from the central station 140, as directed by processor 140A, to the user station 110H via communication 265, as indicated in step 395.

User A can also communicate with financial institute I, preferably via central station 140, to electronically confirm the transfer of the payment amount from its account and the user H can also communicate with financial institute K, preferably via central station 140, to electronically confirm the transfer of payment amount to its account, as will be understood by those skilled in the art.

As introduced above, electronic billing information may be stored in the database 140B2 of memory 140B even for those customers who are not registered with the central station 140. Further, electronic billing information may be stored in the database 140B2 for registered users even if the particular registered user has not requested electronic bill presentment. Accordingly, the central station 140 operates to direct registered users who contact the central station 140 to make payments on the basis of paper bills to the electronic billing information available on the database 140B2 of memory 140B, as will be discussed below.

Figure 4:
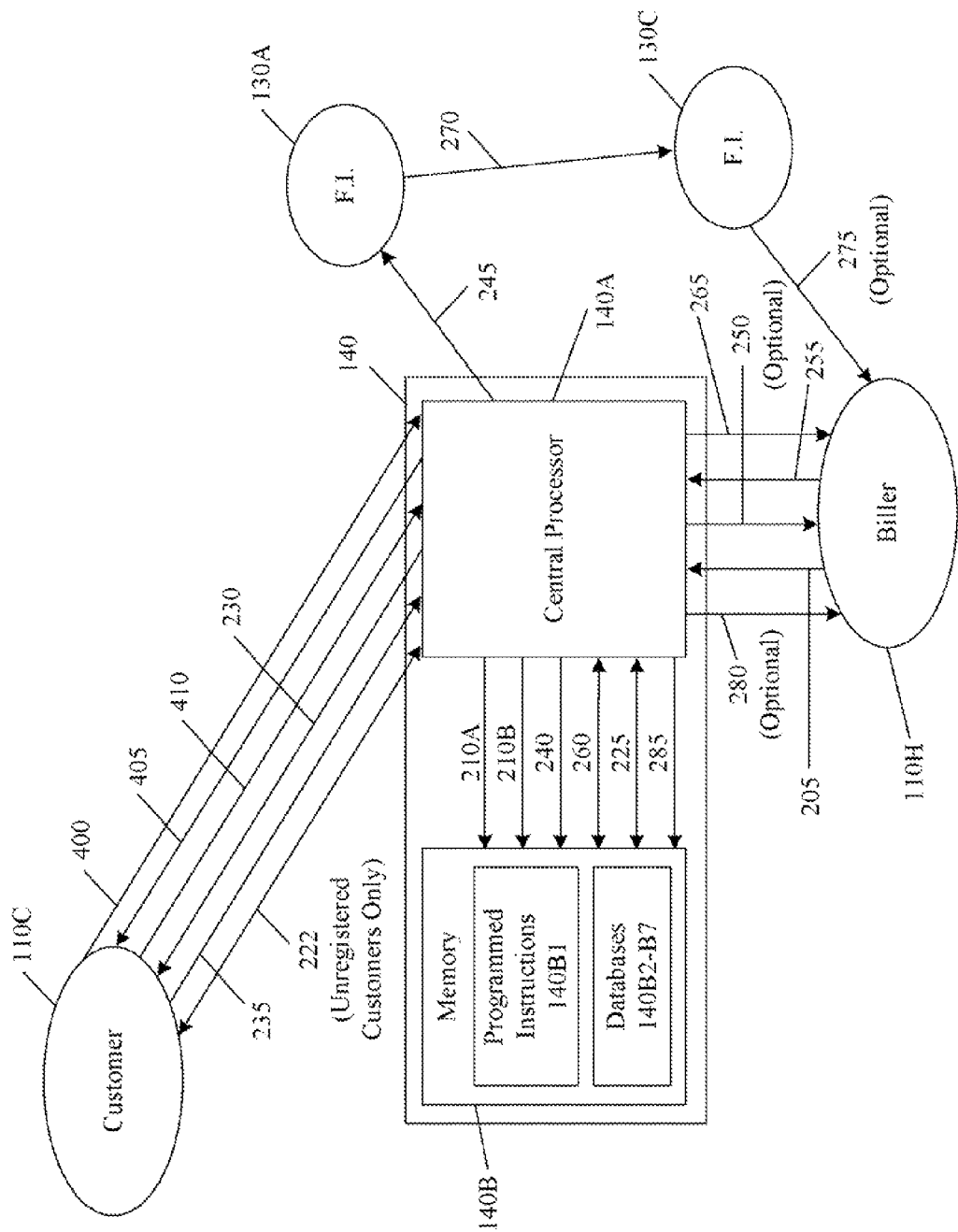
FIG. 4 depicts the communications between various network stations depicted in FIG. 1 to direct payers to electronic bills, in accordance with the present invention.
Figure 5:
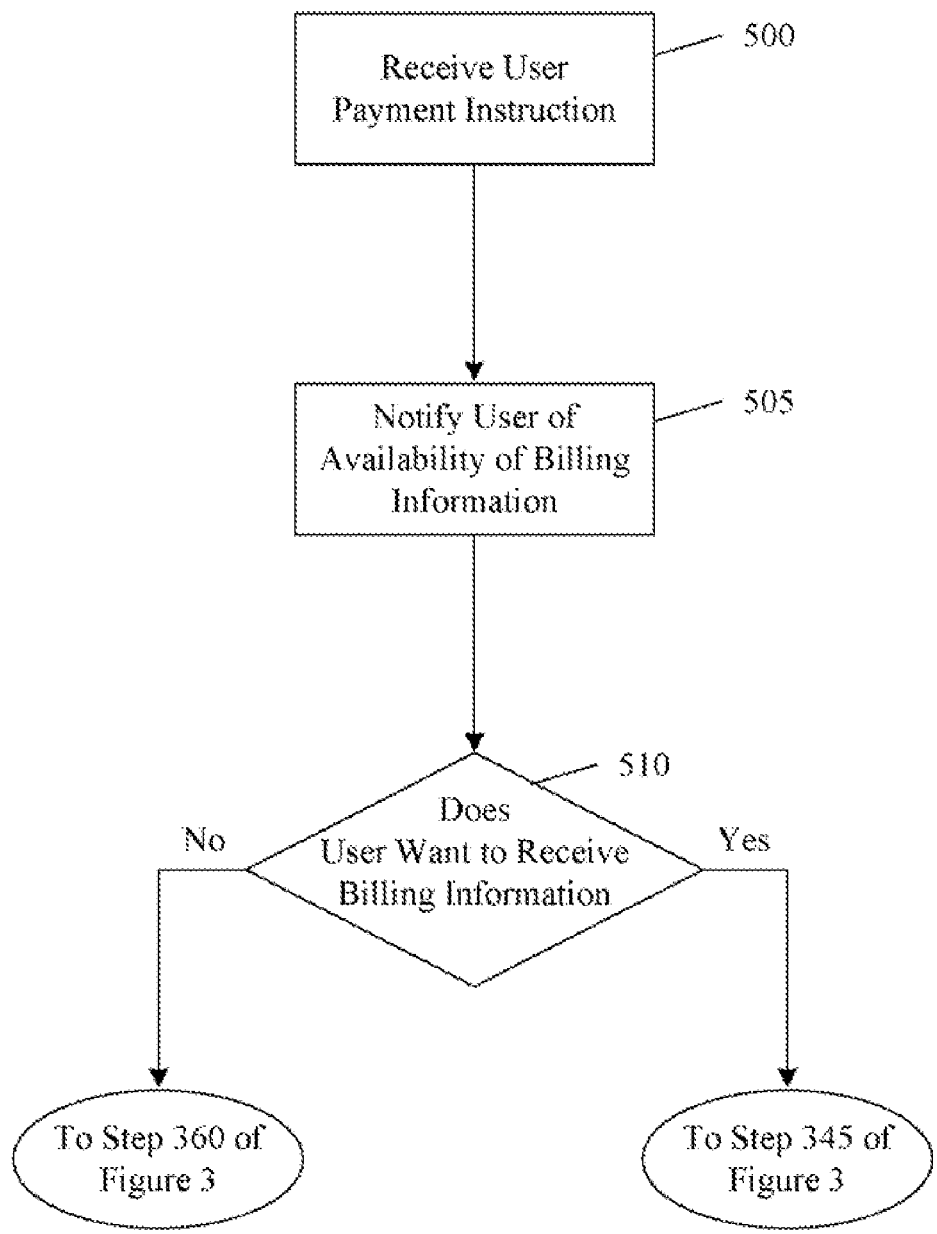
FIG. 5 is a flow chart showing the operations which are performed by the network stations in FIG. 4, in accordance with the present invention.

FIG. 4 is similar to FIG. 2 except that communications 215 and 220 are replaced by communications 400, 405, and 410, which will be described below. The remaining communications shown in FIG. 4, such as communications 205, 210A, 210B, 222, 225, 230, 235, 240, 245, 250, 255, 260, 265, 270, 275, 280, and 285 may be similar to those described above with reference to FIG. 2. Additionally, the various entities and/or components illustrated in FIG. 4, such as the central station 140, the central station processor 140A, the central station memory 140B, the biller user station 110H, and the financial institution user stations 130A, 130C may be similar to those illustrated in FIG. 1. As shown in FIGS. 4 and 5, a payment instruction, to pay a paper bill received in the mail by registered user C, is transmitted by communication 400 from the user station associated with user C, such as user station 110C illustrated in FIG. 1, to the central station 140, and received by the central station processor 140A, as indicated by step 500. In communication 405, the central station 140, directed by the central processor 140A, notifies the applicable user station 110C, of the availability of electronic billing information which is stored in the database 140B2 of memory 140B in association with the user C identifier, as reflected in step 505. The central station processor 140A generates an inquiry to the user C, inquiring if the user C wishes to receive the billing information. The inquiry is also transmitted from central station 140 to user station 110C in communication 405. The user C responds to the query in communication 410 from the payer 110C to central station 140, as indicated in step 510. If the user C responds in the affirmative, i.e. indicating a desire to access to the billing information stored in the database 140B2, operations continue as previously described beginning with step 345 of FIG. 3. If the user C responds in the negative, operations continue as previously described beginning with step 360 of FIG. 3.

Figure 6:
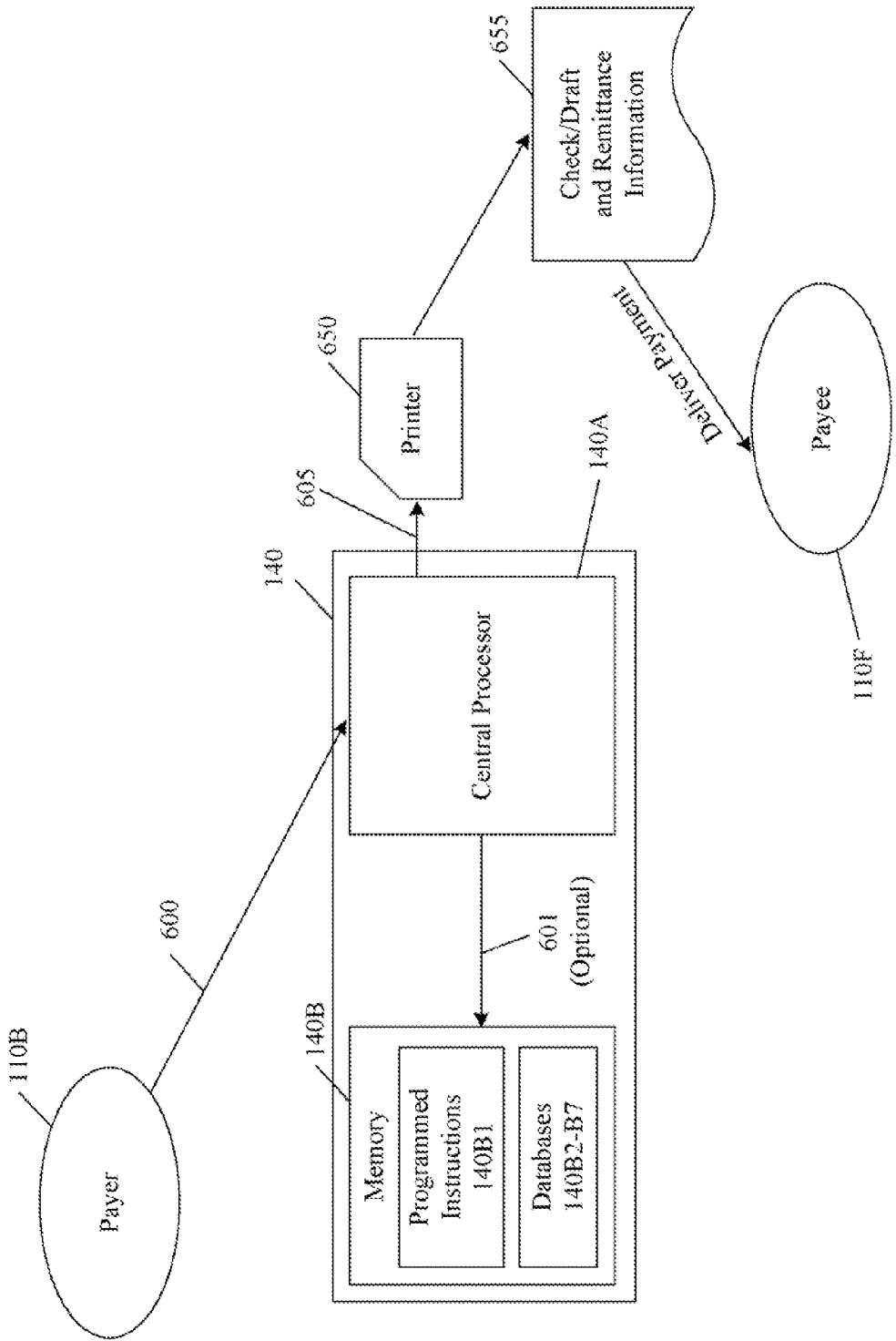
FIG. 6 depicts the communications between various network stations depicted in FIG. 1 to pay paper bills, in accordance with the present invention.
Figure 7:
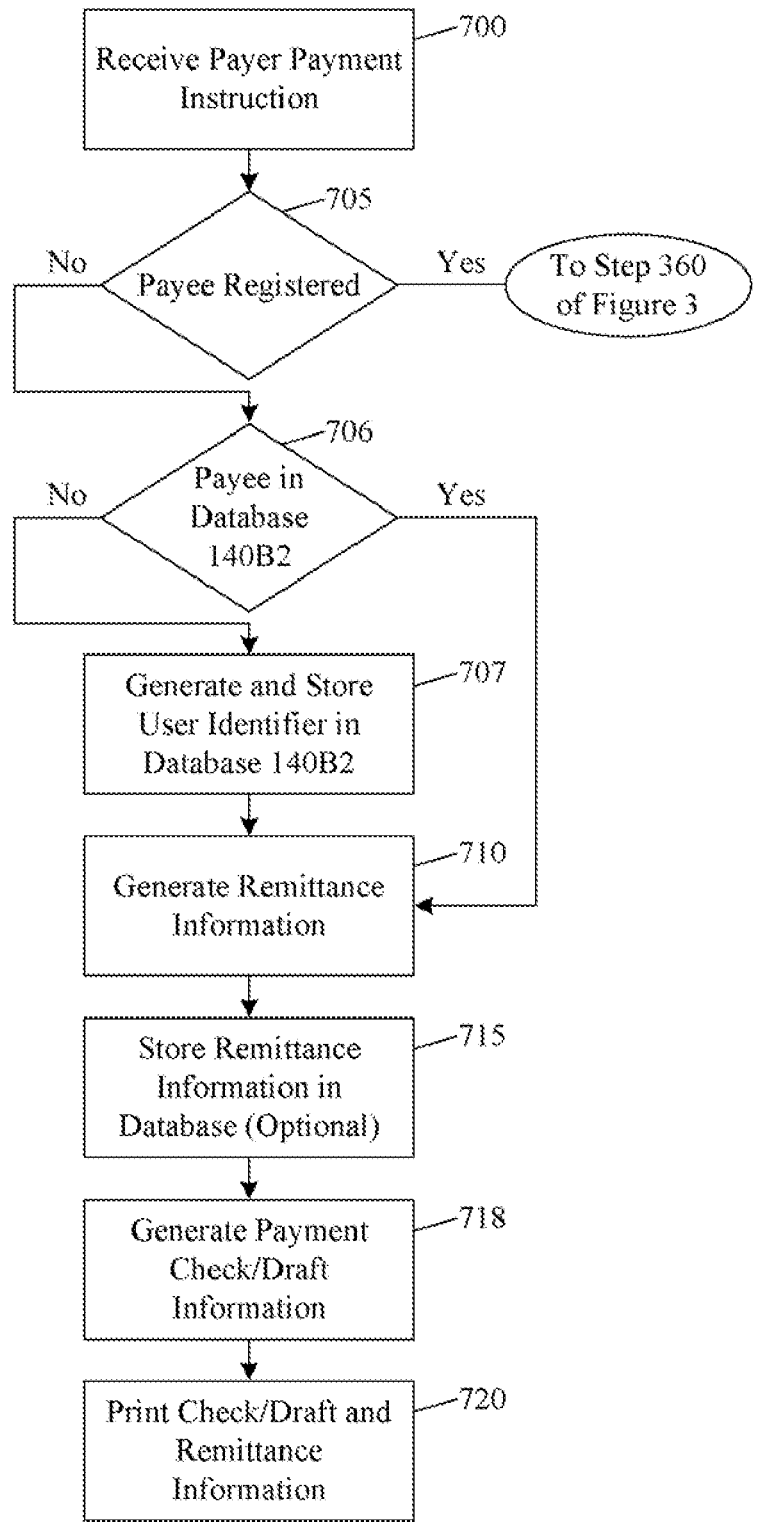
FIG. 7 is a flow chart showing the operations which are performed by the network stations in FIG. 6, in accordance with the present invention.

A registered user may pay any person or entity via the network 100 illustrated in FIG. 1. Thus, a user may direct that payment be made to a registered user, whether or not that user is also an electronic biller. Also, a user may also direct payment to an unregistered user who has no established relationship with network 100. FIG. 6 depicts the communications necessary to perform electronic bill payment of a paper bill received by a registered user via mail delivery from an unregistered user. Certain components illustrated in FIG. 6, such as the central station 140, the central station processor 140A, the central station memory 140B, the payer user station 110B, and the payee user station 110F, may be similar to those components illustrated and described above with reference to FIG. 1. Communications illustrated in. FIG. 6 will be described in conjunction with FIG. 7. In communication 600, a payment instruction, to pay the paper bill received by mail by registered user B, is transmitted from user station 110B to central station 140. The instruction is received by the central station processor 140A, as indicated in step 700. The central station processor 140A, in step 705, makes a determination as to whether or not payee F is registered. If payee F is determined to be a registered user, processing continues with step 360 of FIG. 3.

If payee F is determined to be unregistered, central station processor 140A, in step 706, makes a determination as to whether or not payee F is included in database 140B2. If payee F is not included, in step 707, the central station processor generates and stores a user identifier for payee F in database 140B2. Operations continue with step 710. If payee F is included in database 140B2, operations proceed directly to step 710.

The central processor 140A generates remittance information in step 710. The generated remittance information is preferably identical to that generated in step 360 of FIG. 3, but could be in a somewhat modified form particularly suitable for paper remittance if so desired. Optionally, the generated remittance information may be stored in database 140B2 at step 715 and via communication 601. In step 718 the central station processor 140A generates check/draft information. The generated remittance and check/draft information is transmitted in communication 605 to a printer 650 which, in step 720, prints a paper check/draft and associated remittance information which form a payment document 655. The payment document 655 is delivered to payee F.

Preferably, the central processor 140A also drives the printer 650 to print additional information notifying payee F of the availability of electronic bill presentation and payment services through the central station 140. As payee F receives more and more payments via the central station 140, payee F will become more and more motivated to present its bills and receive its payments electronically over the network 100, and hence to become a registered user of the network. If, as depicted at step 715, the remittance information has been stored in database 140B2, the additional information could also include notifying the payee F of the availability of the stored remittance information and inviting payee F to view the stored remittance information available at central clearinghouse station 140 via the network 100.

FIG. 8 shows a somewhat simplified depiction of a relational database 800 suitable for use as database 140B2 illustrated and discussed above with reference to FIG. 1. FIG. 8 will be helpful in understanding the robustness of the central station 140 of FIG. 1.

As indicated above, preferably each user for whom billing or remittance information is generated, whether or not a registered user, is identified with a user identifier. That is, all of the user identifiers are associated with users that have either registered, been paid through the central station 140 at the request of a registered user or have billing information which is stored at the central database 140B2 at the request of a registered user.

As shown in FIG. 8, the user identifiers are stored in column 805 of the relational database 800. The registration status of each identified user is stored in column 810, in association with the applicable identifier. As shown, the users A-C, E, and H-L are registered users, while users D, F and G are unregistered users. It should be noted that each of the financial institutes I-L are shown to be registered and hence have the ability to electronically present and pay bills, in addition to their previously described functions. The applicable financial institutes identifiers are also stored in column 815 for each of the registered users. Along with the financial institute identifiers are stored applicable payment account numbers (PA) and/or debit account numbers (DA) in column 815. The credit account and the debit account may be the same account. In column 820 billing information can be temporarily stored for each user. As shown, billing information is currently stored for certain registered users as well as certain unregistered users. In column 825 remittance information can be temporarily stored for each user.

As shown, remittance information is currently stored for certain registered users as well as certain unregistered users.

In an especially preferred feature of the invention and as shown in FIG. 1, individual user-class databases, in addition to database 140B2, are maintained by central processor 140A and stored in memory 140B. Additionally, as shown in FIG. 1, one or more other databases, such as databases 140B3-B7, may be stored in memory 140B. Database 140B3 is a list of registered users/billers, registered users who have electronically presented a bill. Database 140B4 is a list of registered users/customers, registered users who have had a bill electronically posted to central station 140 by a registered user/biller for payment. Database 140B5 is a database of unregistered users/customers, unregistered users who have had an bill electronically posted to central station 140 by a registered user/biller for payment. As should be understood, a registered user can appear in one of or both of databases 140B3-140B4. Central processor 140A generates the information stored in these databases each time billing information is transmitted to central station 140A by a registered user.

Figure 10:
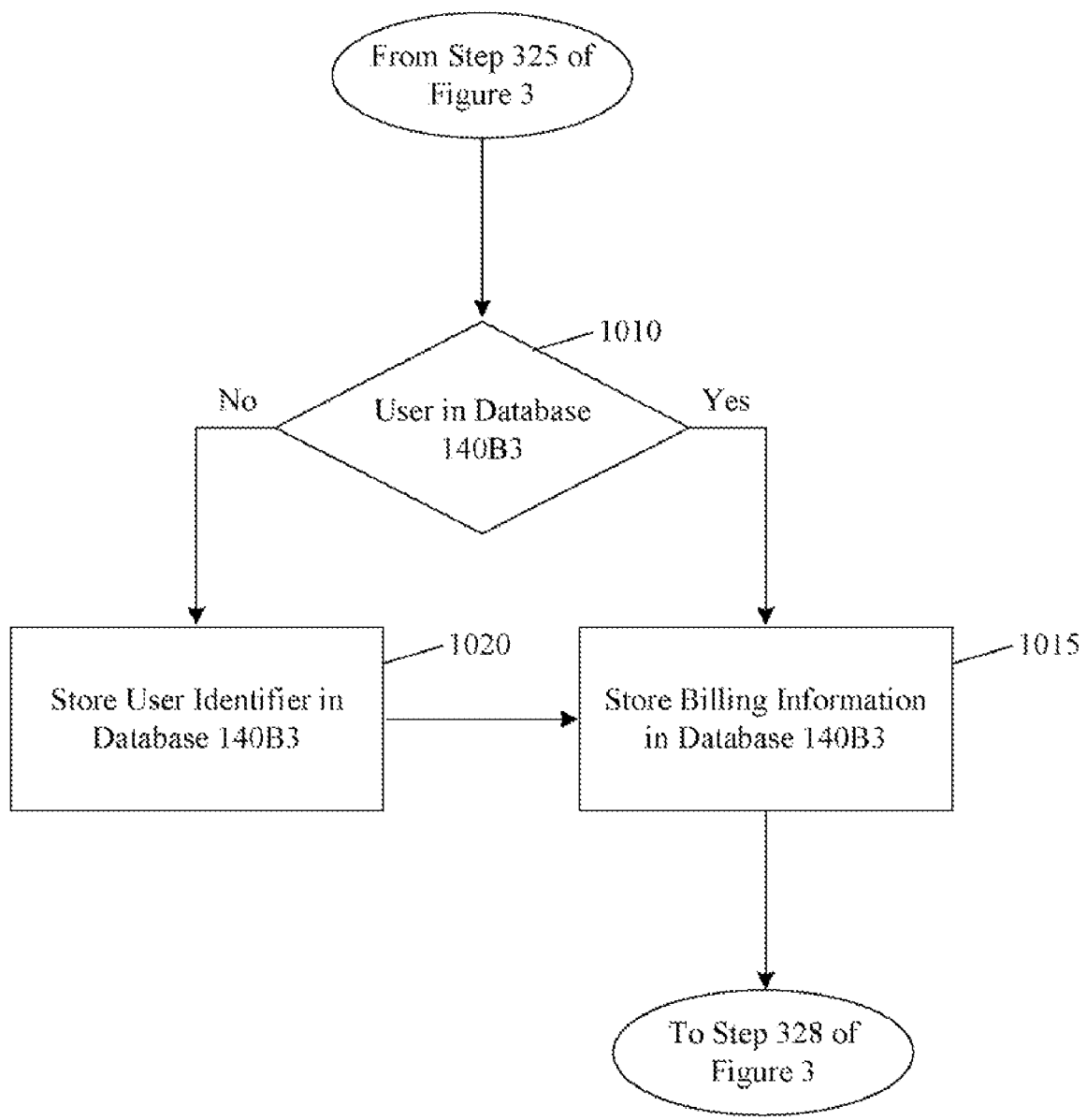
FIG. 10 is a flow chart showing the operations which are performed by the central clearinghouse station processor to maintain a registered user/biller database.

FIG. 9 shows a simplified exemplary depiction of a registered users/billers database, such as database 140B3 illustrated in FIG. 1. This database can include, in addition to information identifying the included registered users/billers 905, billing information 910 about the bills each user has electronically presented through a central station, such as the central station 140 illustrated in FIG. 1. FIG. 10 depicts the processing steps necessary to maintain this database. Following step 325 of FIG. 3, in step 1010, a central processor, such as central processor 140A shown in FIG. 1, accesses database 140B3 to determine if the registered user/biller is included in database 140B3. If the registered user/biller electronically presenting the bill has previously electronically presented a bill, the user will already be included in the database. If yes, billing information for the current bill can is stored in database 140B3 and associated with the registered user/biller identifier in steps 1015. Operations then continue with step 328 of FIG. 3. If the registered user/biller is not included in database 140B3, information identifying the user is added to the database in step 1020. Operations then continue with step 1015.

This database serves to dynamically maintain a list of users who are electronic billers. As a user becomes an electronic biller, whether a new user or an existing user adopting electronic billing, that user is added to this database. Thus, database 140B3 always contains an accurate and current list of users who are electronic billers. The operator of the central clearinghouse station, such as station 140 shown in FIG. 1, at all times knows which of the users are electronic billers. Thus, this database may be used in notifying a registered user that a payee to whom the user is directing payment is an electronic biller, as discussed above. Also, this database may be used in determining if the payee to whom the user is directing payment has electronically presented a bill for this user.

Figure 11:
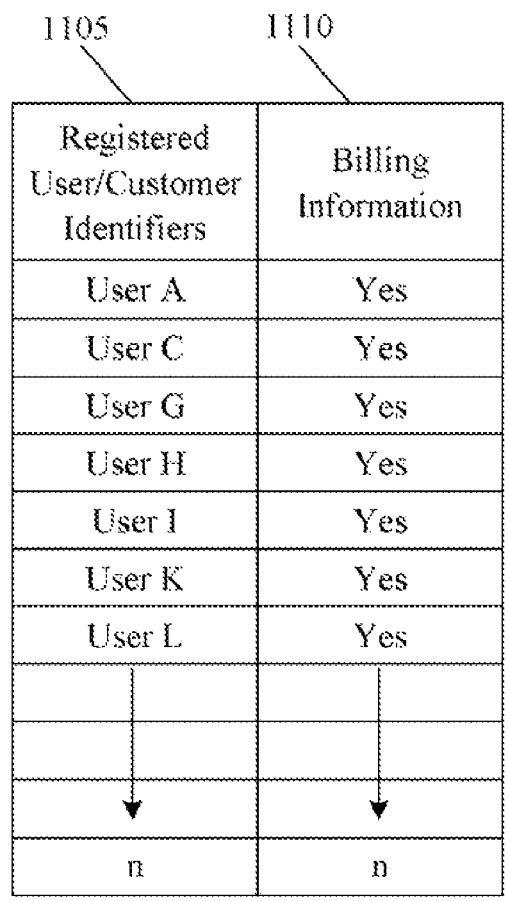
FIG. 11 is a simplified depiction of a registered user/customer database for storing a list of registered users who are customers, in accordance with the present invention.
Figure 12:
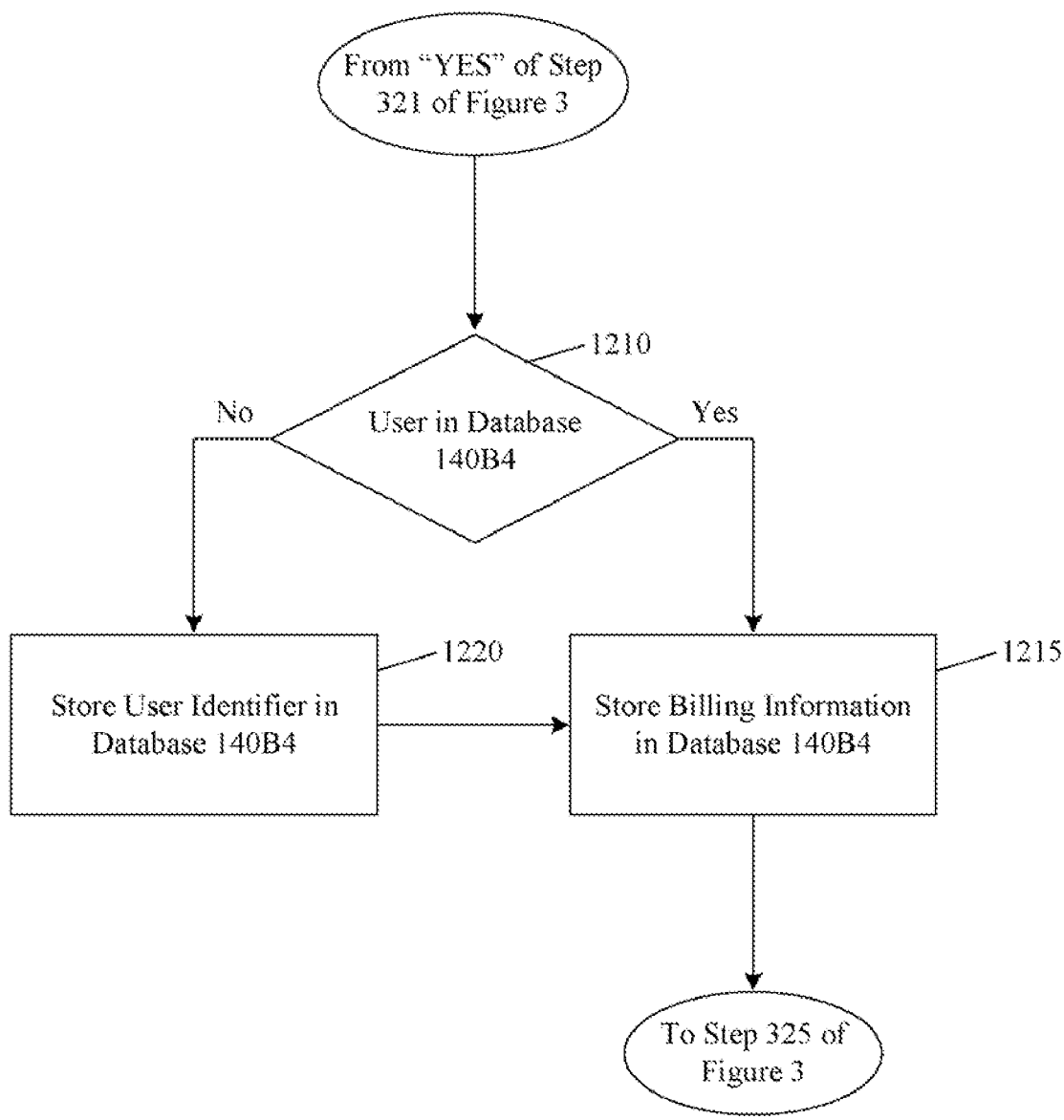
FIG. 12 is a flow chart showing the operations which are performed by the central clearinghouse station processor to maintain a registered user/customer database.

FIG. 11 shows a simplified exemplary depiction of a database of registered users who have had a bill electronically posted to a central clearinghouse station, such as database 140B4 associated with the central station 140 shown in FIG. 1. This database can include, in addition to information identifying the included registered users/customers 1105, billing information about each of the bills posted to central station 140 for the user, 1110. FIG. 12 depicts the processing steps necessary to maintain this database. Following an affirmative decision in step 321, in step 1210, a central processor associated with the central station 140, such as central processor 140A shown in FIG. 1, accesses database 140B4 to determine if the registered user/customer to whom the electronic bill is directed is included in database 140B4. If the registered user/customer has previously had an electronic bill posted for payment by a registered user, the user/customer will already be included in the database. If yes, billing information for the current electronic bill is stored in database 140B4 and associated with the registered user/customer identifier in step 1215. Operations then continue with step 325 of FIG. 3. If the registered user/customer is not included in database 140B4, information identifying the user is added to the database in step 1220. Operations then continue with step 1215.

This database serves to dynamically maintain a list of all customers for whom billing information is stored at central station 140. This database may be used in notifying a user that electronic billing information is stored at central station 140, as discussed above.

As should be understood, the operations depicted in FIGS. 10 and 12 may take place simultaneously, or the operations depicted in FIG. 10 may take place before those depicted in FIG. 12, or vice-versa.

Figure 14:
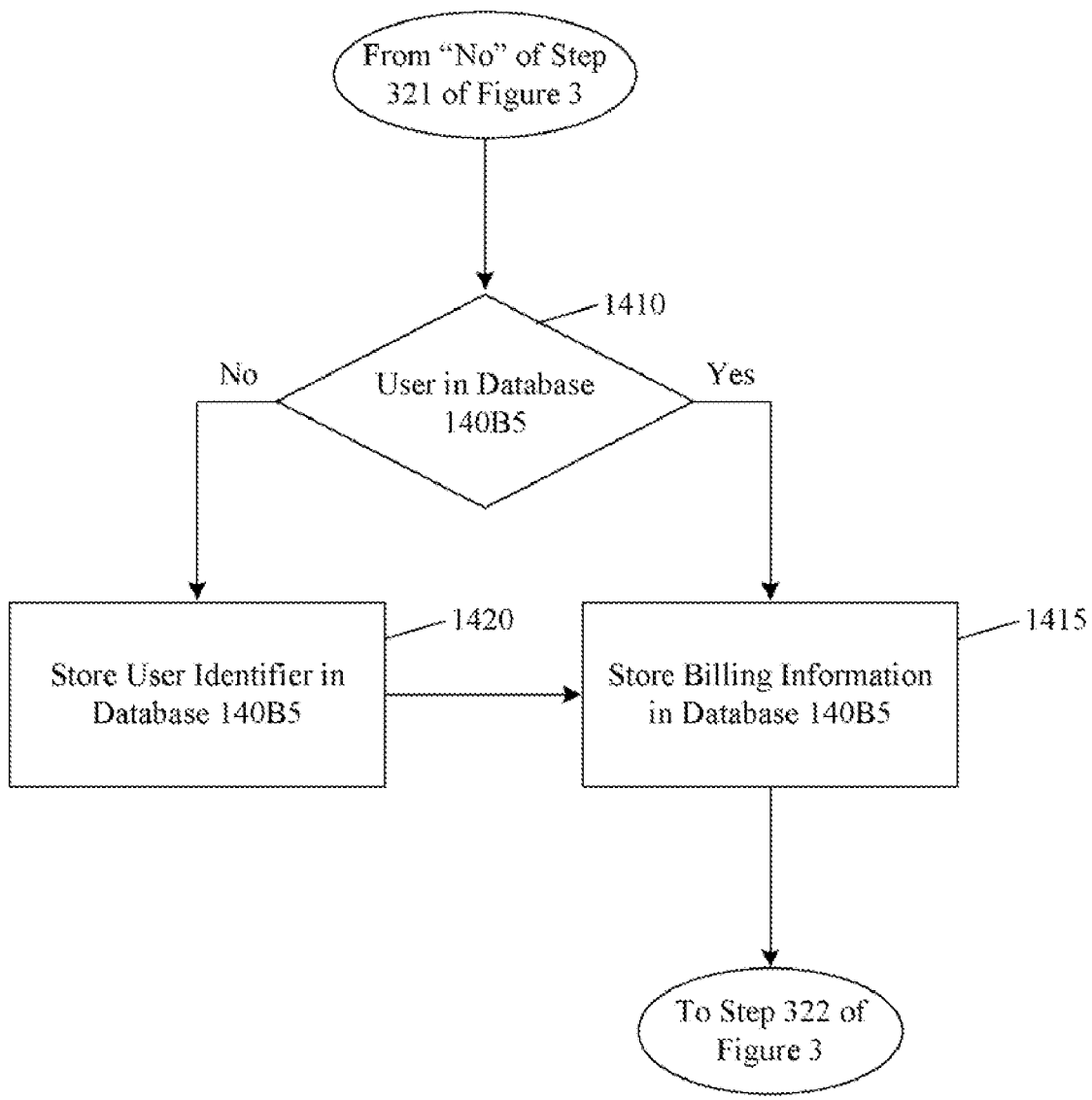
FIG. 14 is a flow chart showing the operations which are performed by the central clearinghouse station processor to maintain a unregistered user/customer database.

FIG. 13 shows a simplified exemplary depiction of a database of unregistered users/customers who have had a bill electronically posted to a central station by a registered user/biller, such as database 140B5 associated with the central station 140 shown in FIG. 1. This database can include, in addition to information identifying the included unregistered users/customers 1305, billing information about each of the bills posted to central station 140 for the unregistered users 1310 by a registered user. FIG. 14 depicts the processing steps necessary to maintain this database. Following a negative determination in step 321 of FIG. 3, in step 1410 central processor 140A accesses database 140B5 to determine if the unregistered user/customer to whom the electronic bill is directed is included in database 140B5. If the unregistered user/customer has previously had an electronic bill posted for payment by a registered user, the user/customer will already be included in the database. If yes, billing information for the current electronic bill is stored in database 140B5 and associated with the unregistered user/customer identifier in step 1415. Operations then continue with step 322 of FIG. 3. If the unregistered user/customer is not included in database 140B5, information identifying the user is added to the database in step 1420. Operations then continue with step 1415.

A beneficial feature of the invention is that a registered user can store at a central clearinghouse station, such as the central clearinghouse station 140 illustrated in FIG. 1, a list of payees the user may plan to pay electronically. Each user's individual list is stored in the form of yet another database in a memory associated with the central clearinghouse station 140, such as memory 140B shown in FIG. 1, or some other storage device (not shown) connected to a processor associated with the central clearinghouse station 140, such as the central processor 140A shown in FIG. 1. FIG. 15 is a simplified exemplary depiction of a database containing a list of payees for user B, and may be similar to database 14036 illustrated in FIG. 1. This database is known as a payee pick-list. A payee pick-list may include payee identifiers 1501, street addresses 1502, cities 1503, states 1504, zip codes 1505, phone numbers 1506, and the users' consumer account numbers 1507 with the payee, among other information. The payee pick-list can include payees who are both registered users and unregistered users.

Figure 16:
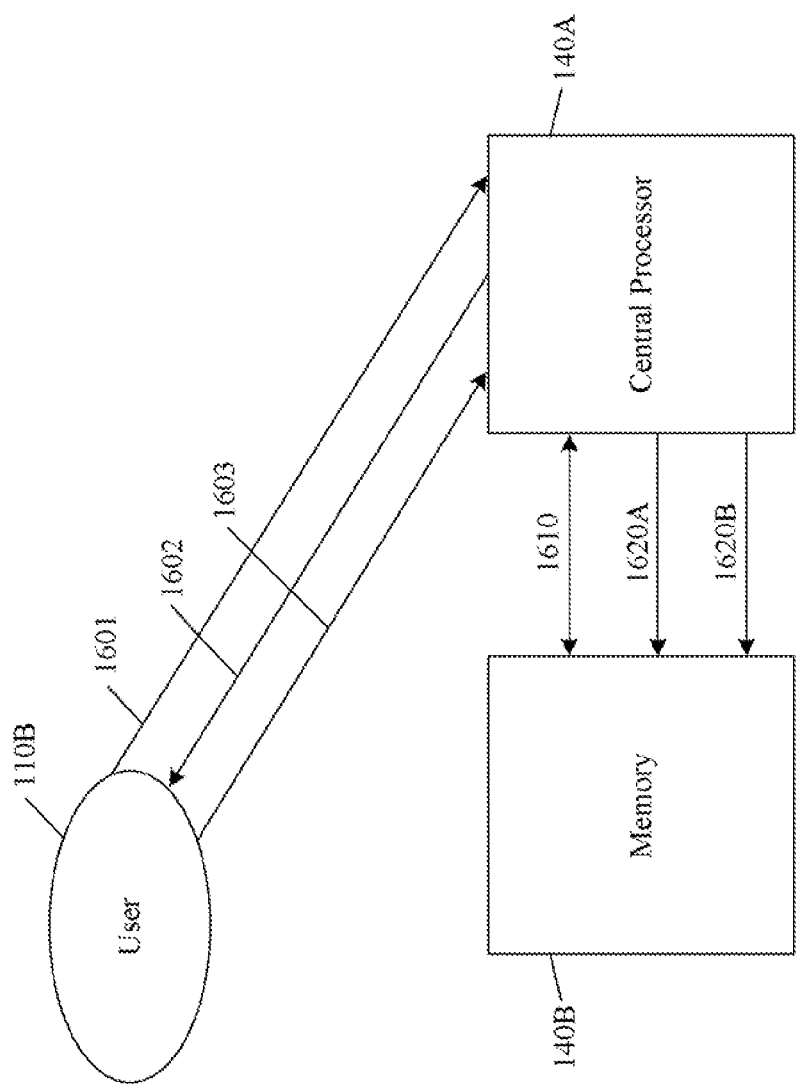
FIG. 16 depicts the communications between various network stations depicted in FIG. 1 to maintain an individual user's payee pick-list.
Figure 17:
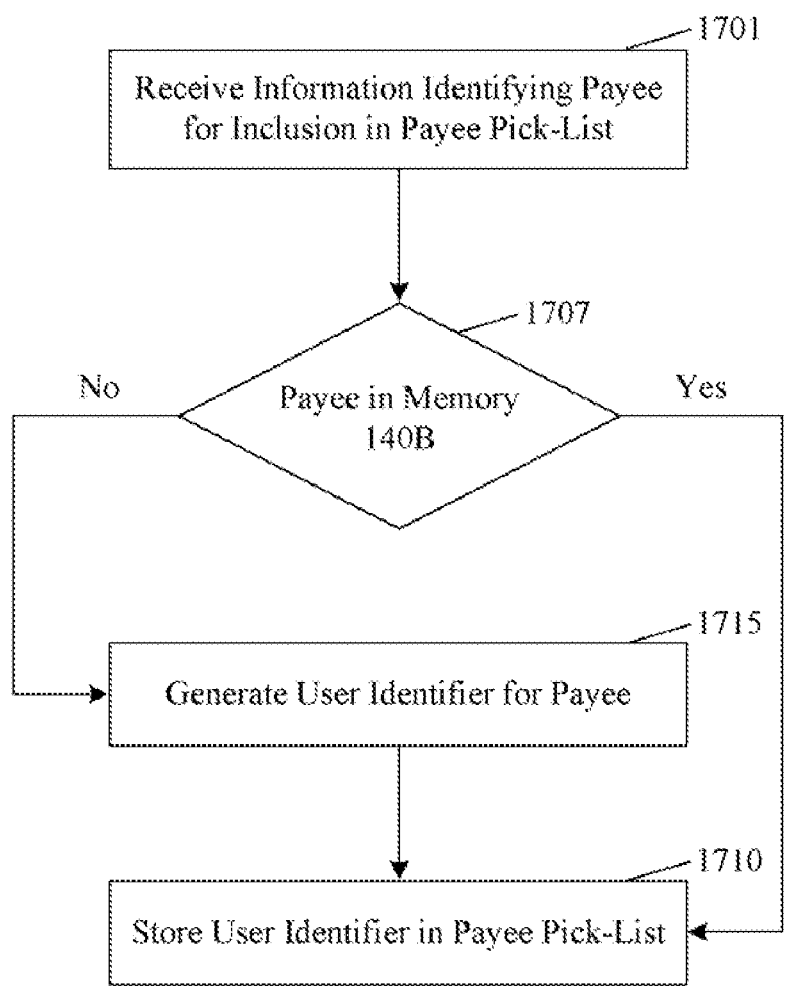
FIG. 17 is a flow chart showing the operations which are performed by the network stations in FIG. 16, to maintain an individual user's payee pick-list in accordance with the present invention.

FIGS. 16 and 17 depict the communications and steps necessary to maintain a payee pick-list for registered user B. Certain components illustrated in FIG. 16, such as the user station 110B, the central station processor 140A, and the central station memory 140B, may be similar to those components illustrated and discussed above with reference to FIG. 1. With reference to FIG. 16, communication 1601, depicts a communication over which user B transmits information identifying a payee for inclusion in a payee pick-list for user B. In FIG. 17, at step 1701, the transmitted information is received at the central station 140. Central processor 140A accesses database 140B2 and determines if a user identifier identifying the payee is stored in a relational database, such as 140B2 of memory 140B via communication 1610 at step 1707. If the payee is in memory 140B, at step 1710, the payee's user identifier is stored in registered user B's payee pick-list via communication 1620A. If a user identifier is not stored in memory 140B, at step 1715 a user identifier is generated for the payee. Then, at step 1710, the user identifier is stored in a payee pick-list database, such as database 140B6 illustrated in FIG. 1, via communication 1620B. The payee pick-list may be established at registration, or any time after registration. Also, at any time, a registered user may add to, delete from or update information in its payee pick-list.

Figure 18:
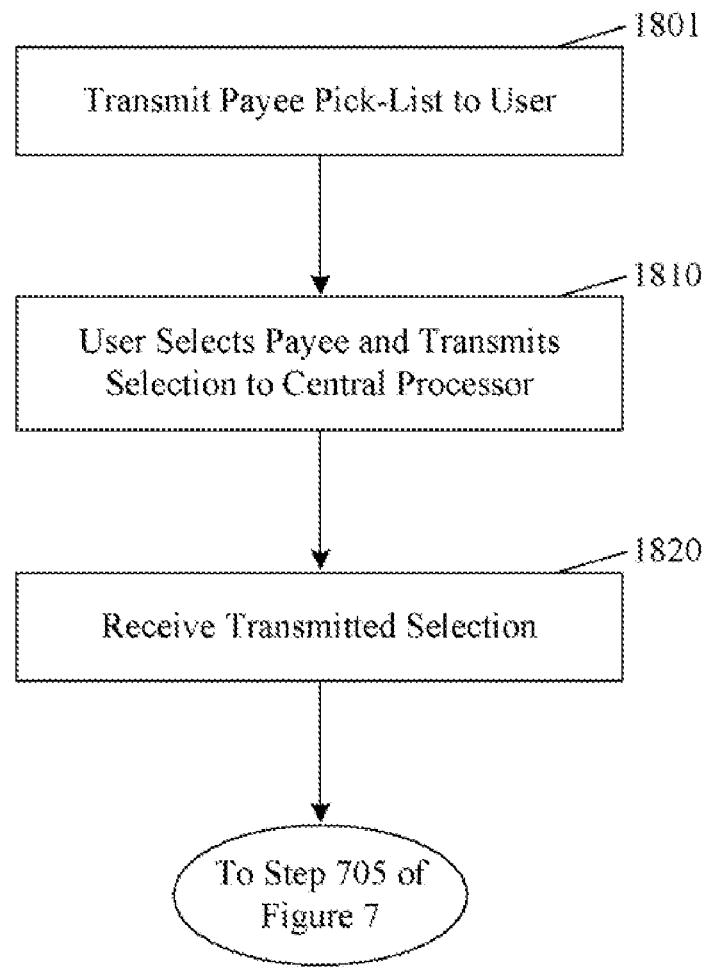
FIG. 18 is a flow chart showing the operations which are performed by the network stations of FIG. 16 to utilize an individual user's payee pick-list.

A registered user may establish a communications session with central station 140 at any time. FIG. 18 depicts exemplary operations during such a communications session. Central station transmits, at step 1801, user B's payee pick-list to user B via communication 1602. User B may then select, at step 1810, a payee from its payee pick-list to which payment is to be directed. This selection, and associated payment instructions, are transmitted to central station 140 via communication 1603 and received at step 1820. Thereafter, operations continue with step 705 of FIG. 7.

It should be understood that multiple payees may be selected from the payee pick-list. Also, it should be understood that user B may at all times pay a payee not included in his or her payee pick-list.

Figure 19:
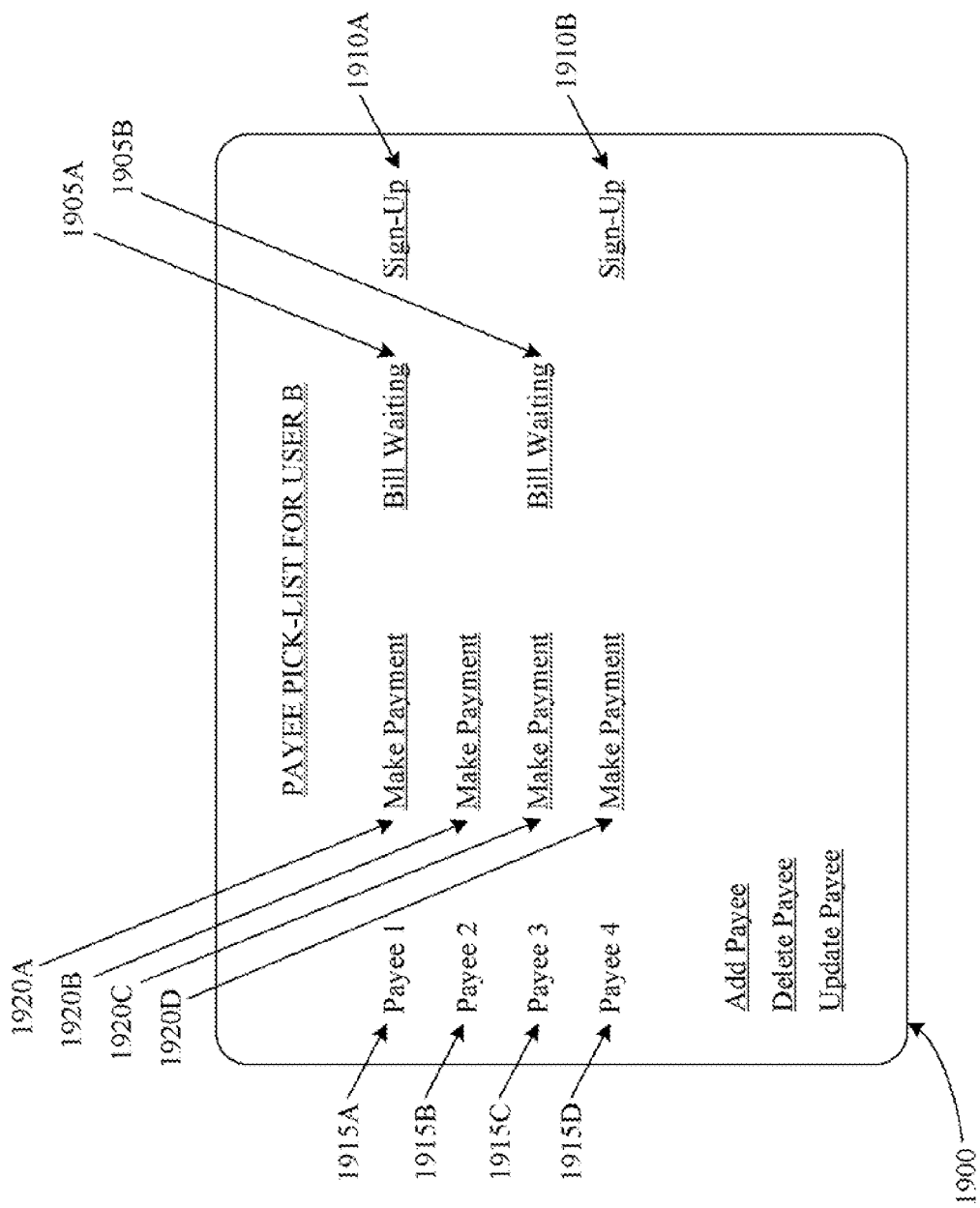
FIG. 19 is a simplified depiction of an individual payee pick-list as presented to a user via a network connection to select a payee for payment.
Figure 20:
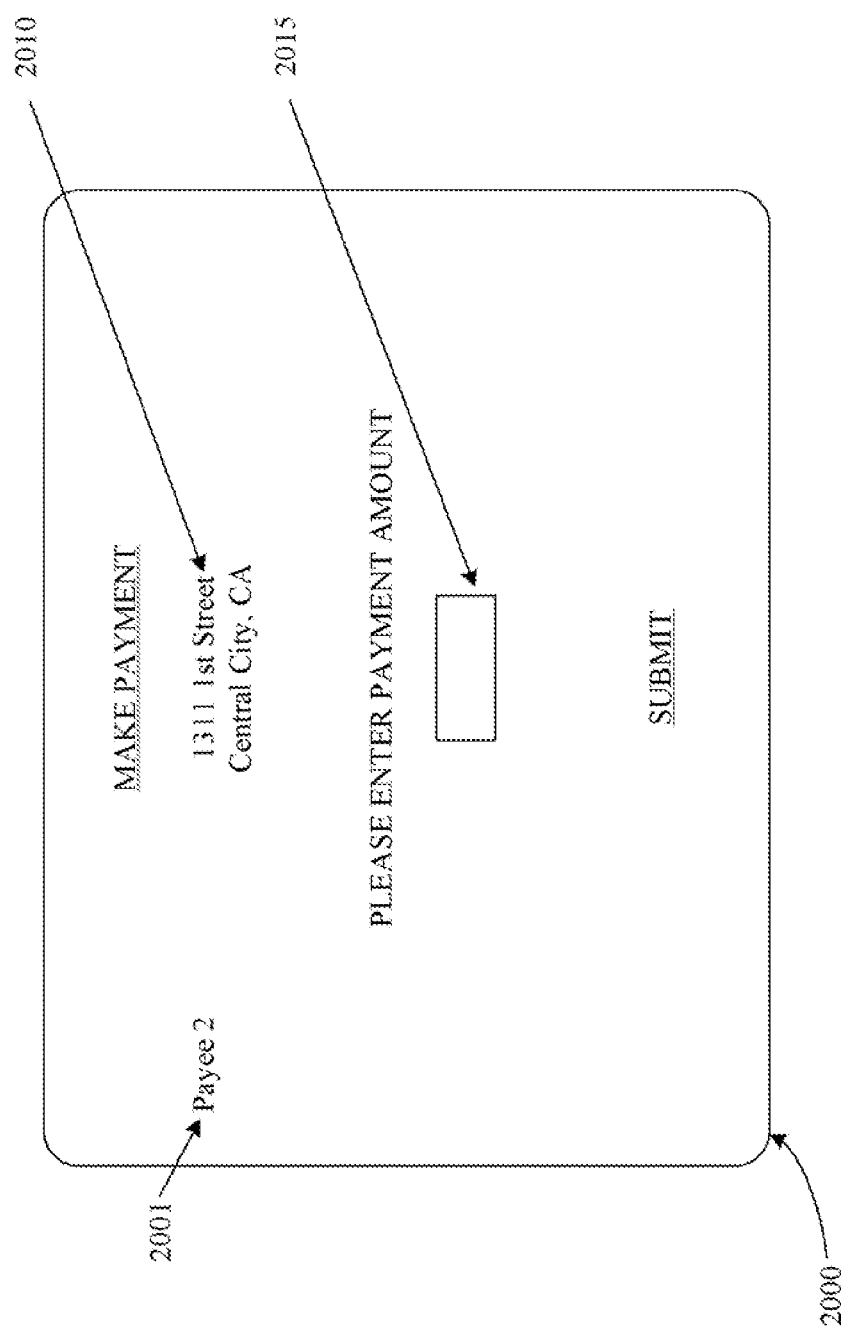
FIG. 20 is a simplified depiction of a payment screen as presented to a user via a network connection to make a payment.

FIG. 19 shows a simplified exemplary depiction of a payee pick-list screen 1900 transmitted to user B and displayed on a computer display. In a particularly preferred aspect of the invention, the payee pick-list transmitted to a registered user will include other information beyond that identifying the included payees 1915A-D. The payee pick-list can include one or more hyper-links 1920A-D selectable to cause a central processor, such as processor 140A shown as a component of the central clearinghouse station 140 in FIG. 1, to transmit to user B a pay directive screen to be displayed on computer display 1900 which includes all necessary information to make a payment, as shown in exemplary payment screen 2000 of FIG. 20. This screen includes the payee name 2001, billing address information 2010, and a payment amount to be completed by the user 2015.

Preferably, the payee pick-list transmitted to user B includes an indication that an electronic bill from a payee, or payees, is stored in a database, such as database 140B2 shown in FIG. 1, for user B, as discussed above and depicted here at 1905A and 1905B. Payer B, also as discussed above, may select to view the stored electronic bill or bills. The indication that an electronic bill is stored at the central clearinghouse station 140 can be a hyper-link selectable by user B to cause central processor 140A to transmit the stored billing information to user station 10B.

Figure 21:
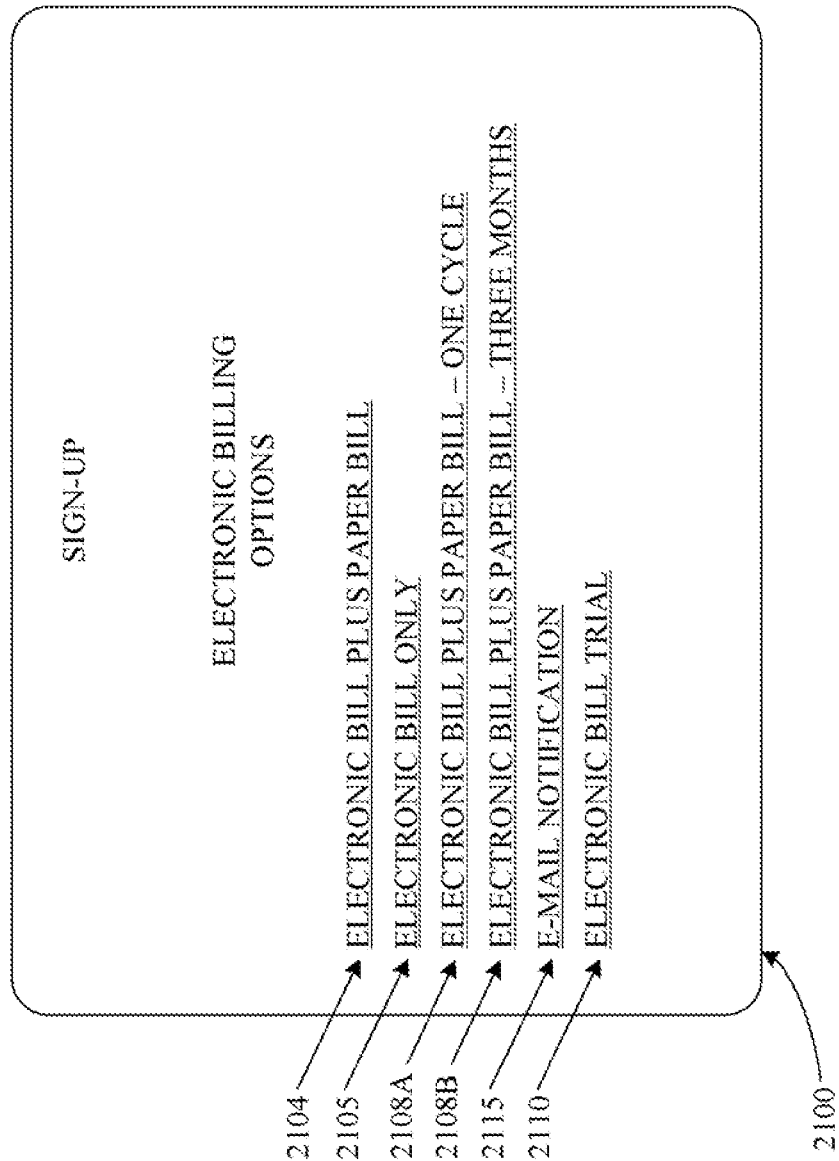
FIG. 21 is a simplified depiction of a sign-up screen as presented to a user via a network connection to sign-up for electronic bill presentment.

The payee pick-list presented to user B also can include an indication that a payee included in user B's payee pick-list offers electronic bill presentment, whether or not billing information from that particular payee for user B is currently stored in memory 140B, 1910A and 1910B. The indication that an included payee offers electronic bill presentment may be a hyper-link selectable by user B to cause central processor 140A to inform the selected payee that user B has selected electronic bill presentment for future bills. Central clearinghouse station 140 may inform the payee of the selection by a network communication or by traditional mail or telephonic communication. Or, selection of the hyper-link may cause central processor 140A to transmit to user B a screen 2100 for display which includes electronic billing options, as shown in simplified exemplary FIG. 21. As shown, the options can include receiving both an electronic bill and a paper copy of the bill 2104, or receiving electronic bills only 2105. Also, a user can select to receive electronic bills and paper bills for a period of time, and thereafter receive only electronic bills, perhaps for one billing cycle or for three months 2108A and 2108B. It should be understood that the period can be any period. The user can also sign-up for a trial subscription of electronic billing 2110. That is, a user will receive a limited number of electronic bills along with paper bills, then billing will revert back to exclusively paper billing. Yet another option is to receive an e-mall notification of any future stored billing information being available at central clearinghouse station 140, 2115. It should be understood by one skilled in the art that other options are possible, though not depicted in FIG. 21.

Figure 22:
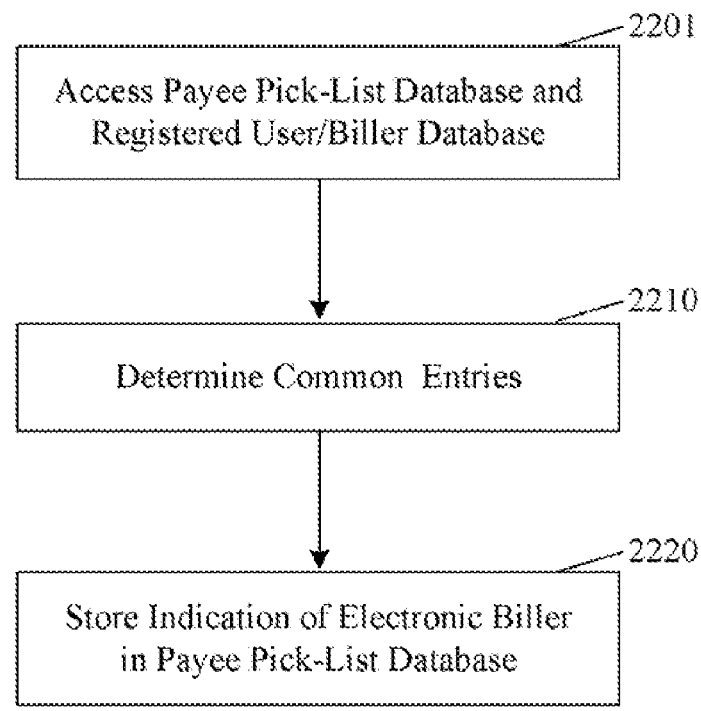
FIG. 22 is a flow chart showing the operations which are performed by the network stations of FIG. 16 to indicate electronic bill presentment availability.
Figure 23:
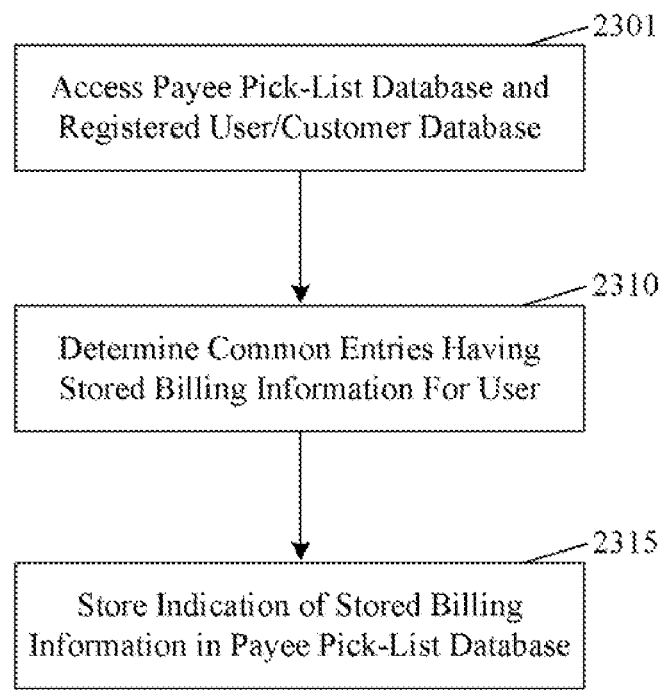
FIG. 23 is a flow chart showing the operations which are performed by the network stations of FIG. 16 to indicate stored billing information availability.

FIGS. 22 and 23 present operations of a central processor, such as processor 140A shown in FIG. 1, in compiling the information to be presented to a user along with the payees included in the user's payee pick-list. After user B has established a communication with a central clearinghouse station, such as central clearinghouse station 140 illustrated in FIG. 1, at step 2201, central processor 140A accesses user B's stored payee pick-list database, which may be similar to database 140B6 shown in FIG. 1, and the registered user/biller database, which may be similar to database 140B3 shown in FIG. 1. At step 2210, central processor 140A determines the common entries between the two databases. For any common entry, central processor 140A stores an indication in the user B payee pick-list database associated with the user identifier for the common entry that the payee is an electronic biller, as depicted at step 2220.

At step 2301, central processor 140A accesses user B's stored payee pick-list database 140B6 and a database of unregistered customers who have had a bill posted to the central clearinghouse station 140, such as database 140B5 illustrated in FIG. I. As shown in step 2310, central processor 140A determines if any of the user B payee pick-list payees also have stored billing information for user B at the central clearinghouse station 140. For any payees having stored billing information for user B at the central station, central processor 140A stores an indication in the user B payee pick-list database associated with the user identifier for the payee having stored the bill at the central clearinghouse station 140 at step 2315.

It should be understood that database 140B2 may be accessed in place of either of or both of a database of registered users/billers who have electronically presented a bill and a database of registered users/customers who have had a bill electronically posted to the central station 140, such as databases 140B3 and 140B4 illustrated in FIG. 1, as depicted in steps 2201 and 2301. However, processing is most efficient when accessing databases 140B3 and/or 140B4, as database 140B2 contains a greater volume of information than either of these databases.

It should also be understood that the steps in FIGS. 22 and 23 may take place simultaneously, or the steps of FIG. 22 may follow the steps of FIG. 23, or vice versa. In any event, the steps discussed and shown further reveal the robustness of central processing station 140. The central processor 140A functions to dynamically indicate availability of electronic bill presentment and availability of stored billing information. Prior to each transmission of a user's payee pick-list, the central processor 140A determines which of the payees are electronic billers and which of those have submitted billing information to the central processor 140A. Since, as described above, each electronic biller is included in the user/biller database, and since that database is updated every time an electronic bill is submitted, each time central processor 140A determines the common entries between the user/biller database and a user payee pick-list database, the results of that determination are accurate and up-to-date.

Figure 24:
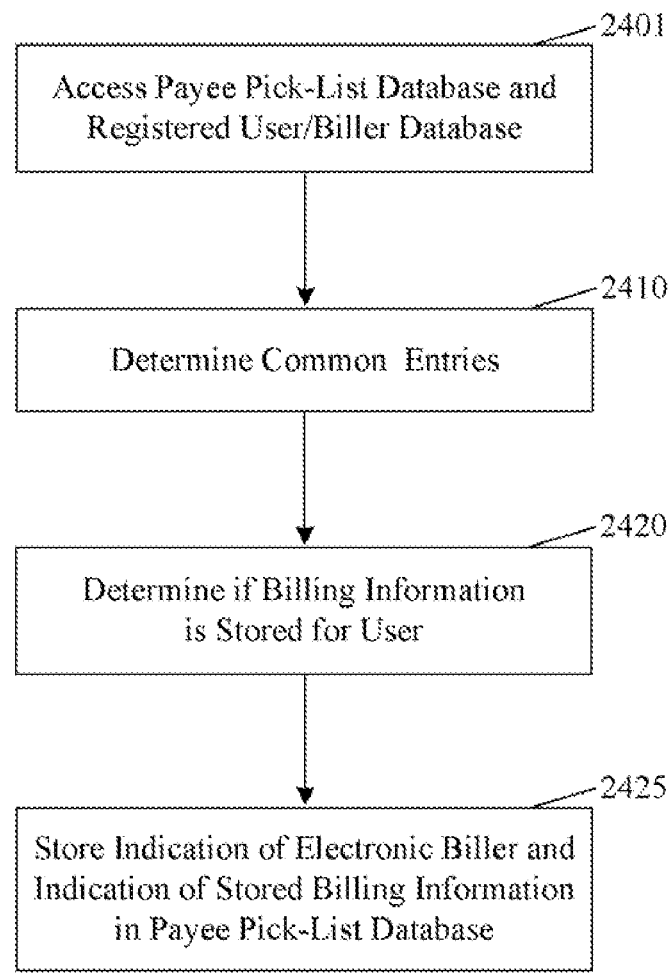
FIG. 24 is a flow chart showing alternative operations which are performed by the network stations of FIG. 16 to indicate both availability of electronic bill presentment and availability of stored billing information.

FIG. 24 depicts an alternative implementation of the present invention. Due to the billing information stored associated with the user identifier for each registered user/biller in a database of registered users/billers who have electronically presented a bill, such as database 140B3 shown in FIG. 1, the steps of FIGS. 22 and 23 can be combined. At step 2401, a central processor, such as central processor 140A shown in FIG. 1, accesses both the payee pick-list database for user B, which may be similar to database 140B6 illustrated in FIG. 1, and the registered user/biller database 140B3. The central processor 140A determines any common user identifiers between the two databases at step 2410. With the billing information being stored in database 140B3, central processor 140A next determines if any of the billing information stored in association with a common entry is for a bill directed to user B, as depicted at step 2420. An indication that a payee is an electronic biller and an indication of any stored billing formation is added to user is payee pick-list associated with the user identifier of the electronically presenting user at step 2425 for any common entries and any of the common entries with stored billing information directed to user B.

Figure 25:
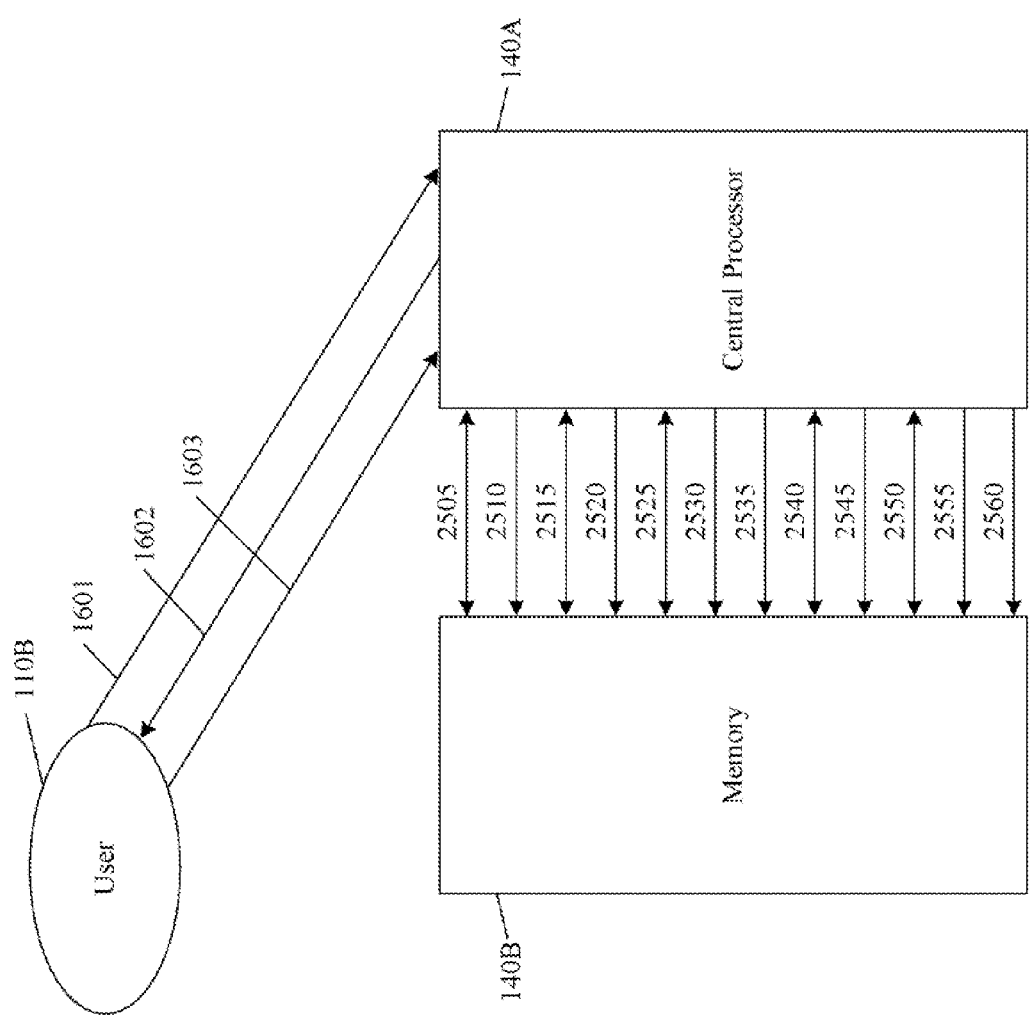
FIG. 25 presents alternative communications between various network stations depicted in FIG. 1 to maintain an individual user's payee pick-list, a master payee pick-list, and to include additional information in an individual payee pick-list.
Figure 26:
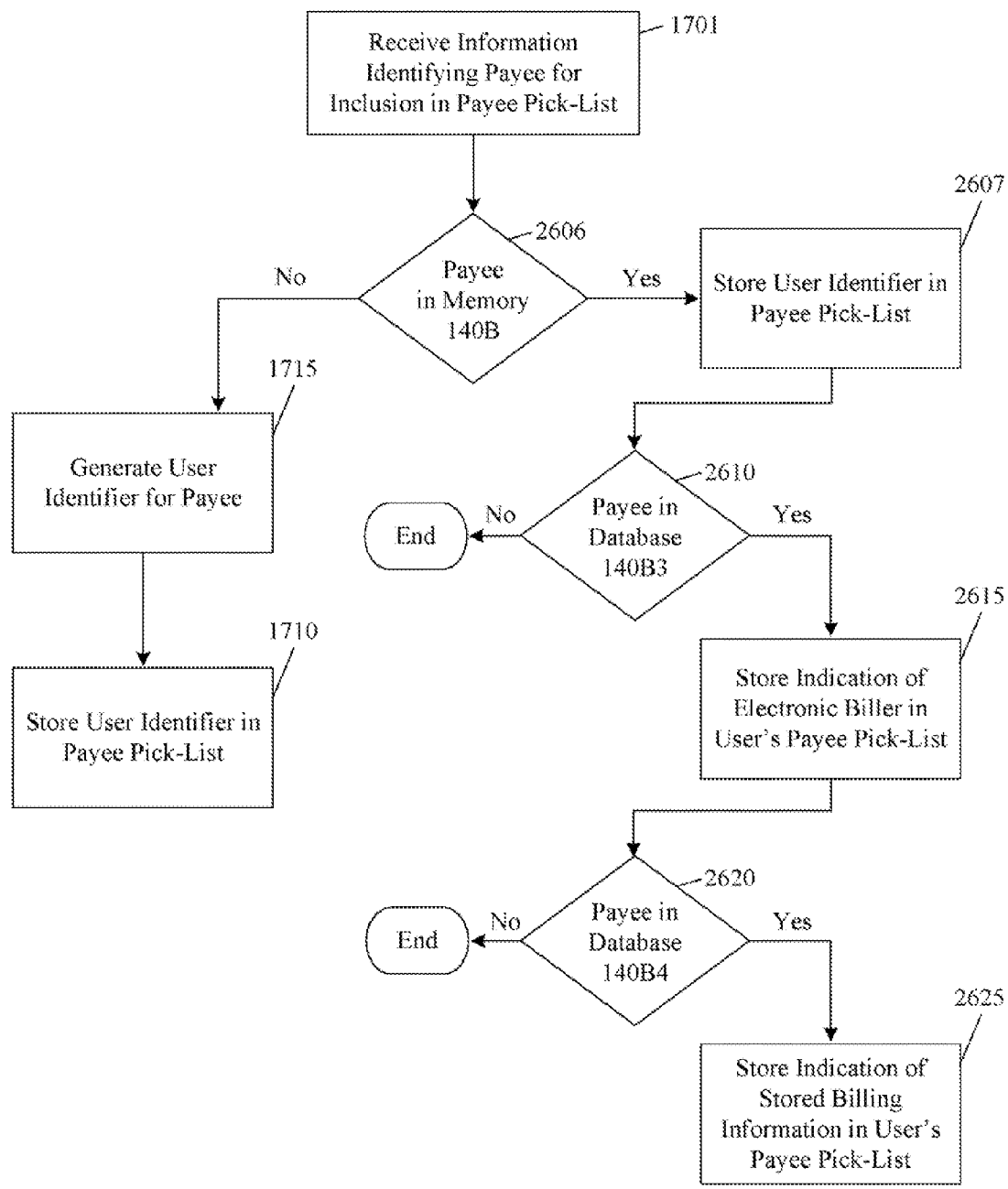
FIG. 26 is a flow chart showing alternative operations which are performed by the network stations of FIG. 25 to maintain individual payee pick-lists and to indicate availability of additional information.

In yet another implementation, the processing necessary to include further information beyond payee identifiers presented with a user's payee pick-list can occur in a different manner from that described above. FIGS. 25 and 26 depict alternative communications and operations in storing a payee in user Ws payee pick-list database. As discussed above, prior to any transmission 1602 of user B's pick-list to user B 110B (such as a transmission 1602 in response to a request 1601 received from user B), a determination is made by a central processor, such as processor 140A shown in FIG, 1, as to the electronic billing status of each included payee. This electronic billing status includes determining if the payee is an electronic biller and if the payee has billing information for the user stored in memory, such as memory 140B shown in FIG. 1. Alternatively, this determination can be made whenever user B adds a payee to its payee pick-list, whenever a new electronic biller is added to a the registered user/biller database, such as database 140B3 illustrated in FIG. 1, and whenever a new payee is added to the registered user/customer database, such as database 140B4 illustrated in FIG. 1. As desired user B 110B may then communicate a selection 1603 of a payee from the payee pick-list for receipt by the central processor 140A.

Following steps 1701 of FIG. 17, the processing to add a payee to the payee pick-list is somewhat different than described above. As shown in FIG. 26, if central processor 140A determines that the payee is not included in memory 140B at step 2606, processing continues as described above with steps 1715 and 1710 shown in FIG. 17. However, if central processor 140A determines that the payee is included in memory 140B, operations continue with step 2607. Central processor 140A stores the payee's user identifier in user B's payee pick-list. At step 2610, central processor 140A accesses database 140B3 via communication 2505 of FIG. 25 to determine if the payee is a registered user/biller. If not, operations end. If the payee is a registered user/biller, an indication is added to a database containing a list of payees for user B, such as database 140B6 illustrated in FIG. 1, via communication 2510 that the payee is a registered user/biller at step 2615.

Operations continue with step 2620. Via communication 2515, central processor 140A accesses database 140B4 to determine if the payee has stored billing information for user B in this database. If not, operations end. If so, an indication is added to database 140B6 via communication 2520 and at step 2625 that billing information is stored for user B. As a result of the processing depicted in steps 2610, 2615, 2620, and 2625, whenever a user adds a payee to its payee pick-list, an accurate and current indication of electronic billing status is included in the payee pick-list for that payee.

It should be understood that the processing depicted in steps 2610, 2615, 2620, and 2625 is similar to that depicted in steps 2201, 2210, and 220 of FIG. 22 and steps 2301, 2310, and 2325 of FIG. 23. Thus, the alternative use of database 140B2 discussed above in relation to these steps also applies to the processing depicted in steps 2610, 2615, 2620, and 2625.

When the indication of electronic billing status is created at initial storage of a payee identifier in an individual payee pick-list instead of prior to each transmission of the list to the user, each individual payee pick-list is kept up current the following processing. This processing is necessary, as a user/payee may become an electronic biller subsequent to that user/payee being added to an individual payee pick-list. Also, an electronic biller may post billing information to the central station 140 for an individual user subsequent to that user adding that user/payee to its individual payee pick-list.

Central processor 140A serves to maintain yet another database, known as a master payee pick-list. This database is also stored in memory 140B as database 140B7, as shown in FIG. 1. The master payee pick-list is a list of every payee which appears on at least one individual payee pick-list. FIG. 27 is a simplified exemplary depiction of the database. In addition to user identifiers for each payee appearing in an individual payee pick-list 2701, the database also contains an indication of each user on whose individual payee pick-list the payee appears 2710, and the payee street address 2711, city 2712, state 2713, zip code 2714, and phone number 2715. The master payee pick-list is kept current by the following processing depicted in FIGS. 28 and 29.

Figure 28:
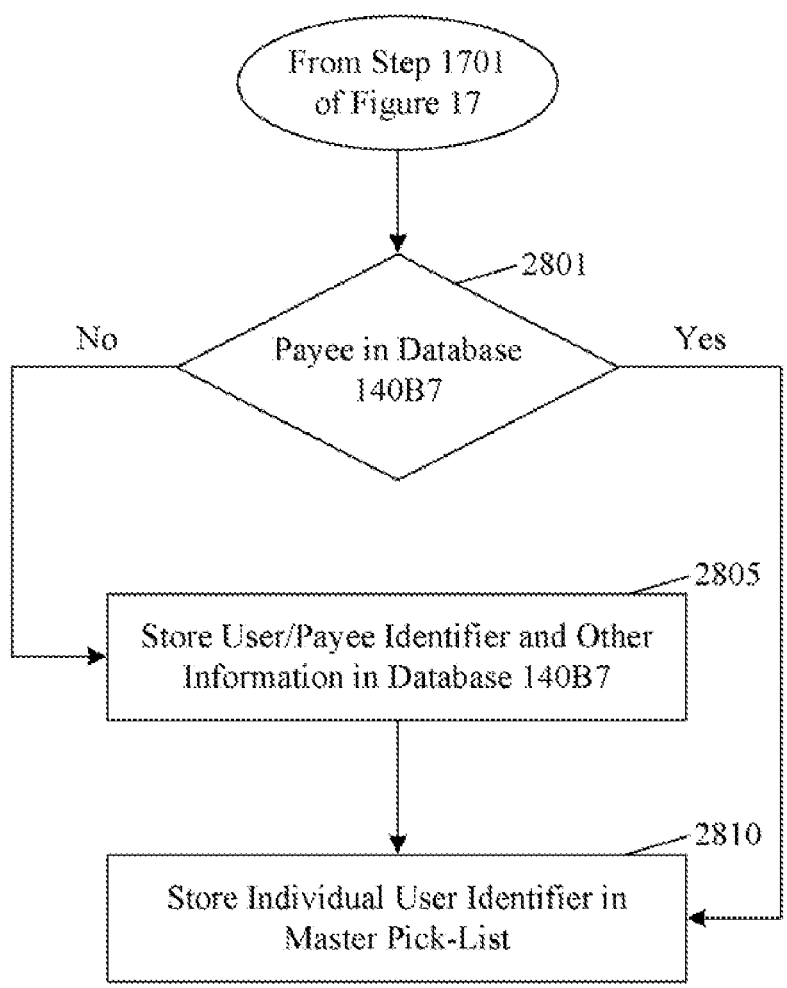
FIG. 28 is a flow chart showing operations performed by the network stations of FIG. 25 to maintain a master payee pick-list.

Whenever a registered user adds a payee to its individual payee pick-list, following step 1701 of FIG. 17, at step 2801 of FIG. 28 and via communication 2525, central processor 140A determines if the payee is included in the master payee pick-list.

If not, the user identifier for the payee, along with the other information described above, is stored in the master payee pick-list at step 2805 and via communication 2530. Operations continue with step 2810. If the payee is included in the master payee pick-list, at step 2810, the user identifier identifying the individual user adding the payee to its individual payee pick-list is stored in the master payee pick-list associated with the payee identifier, via communication 2535.

Figure 29:
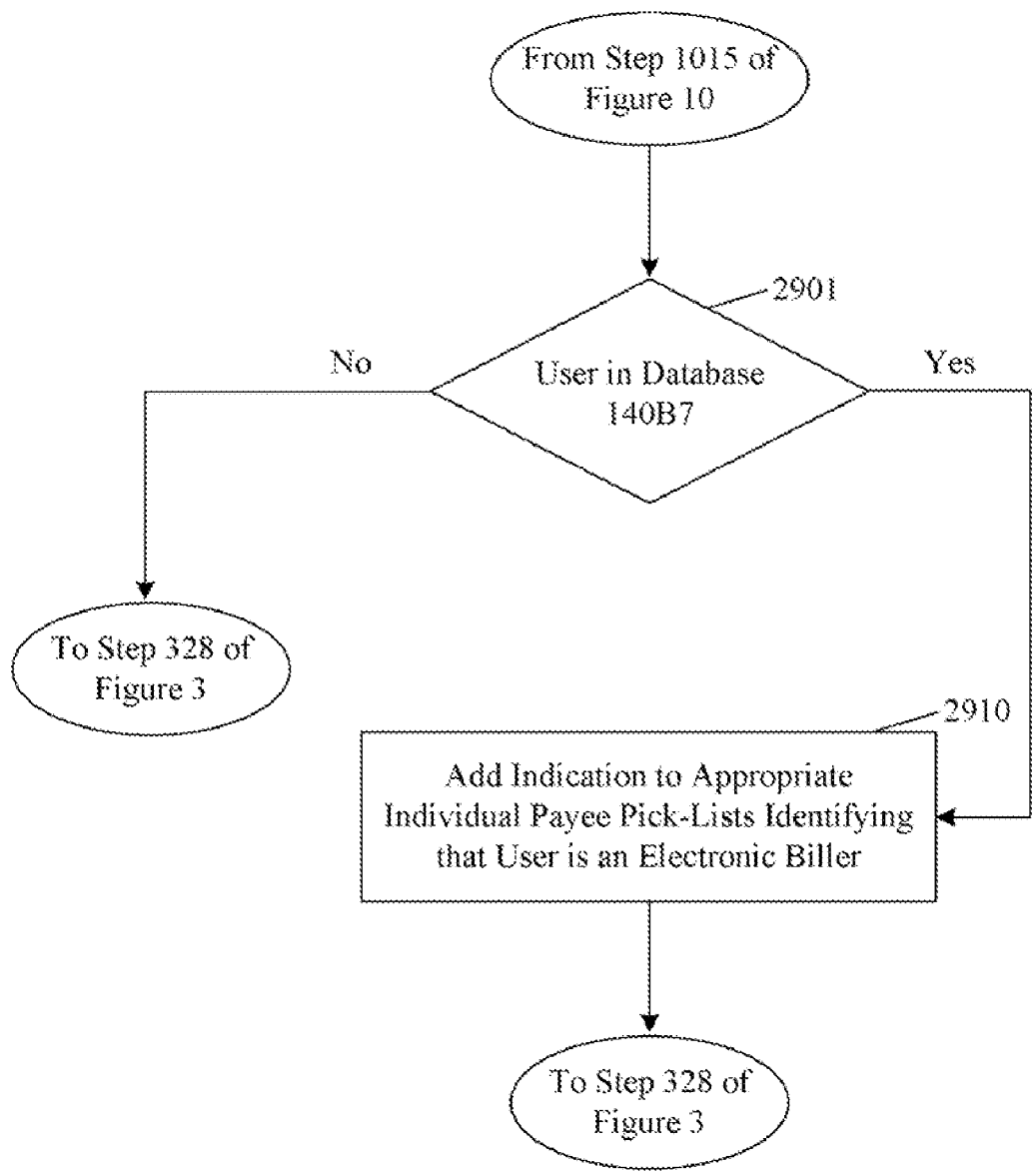
FIG. 29 is a flow chart showing alternative operations performed by the network stations of FIG. 25 to determine if a new registered user/biller is included in a payee pick-list.

Whenever central processor 140A adds a new registered user/biller to a database of registered billers, such as database 140B3 illustrated in FIG. 1, central processor 140A also determines if the added registered user/biller is included in a master payee pick-list database, such as database 140B7 illustrated in FIG. 1, as depicted in FIG. 29, step 2901 and via communication 2540. Step 2901 follows step 1015 of FIG. 10. If the new registered user/biller is not included in the master payee pick-list database 140B7, operations continue with step 328 of FIG. 3. If the new registered user/biller appears in the master payee pick-list, operations continue with step 2910. The central processor 140A adds an indication to each individual payee pick-list database in which the new registered user/biller appears as a payee that the new registered user/biller is an electronic bill presenter via communication 2545. Due to the processing depicted in steps 2901 and 2910, each individual payee pick-list is kept current as to which of the included payees are electronic bill presenters.

Figure 30:
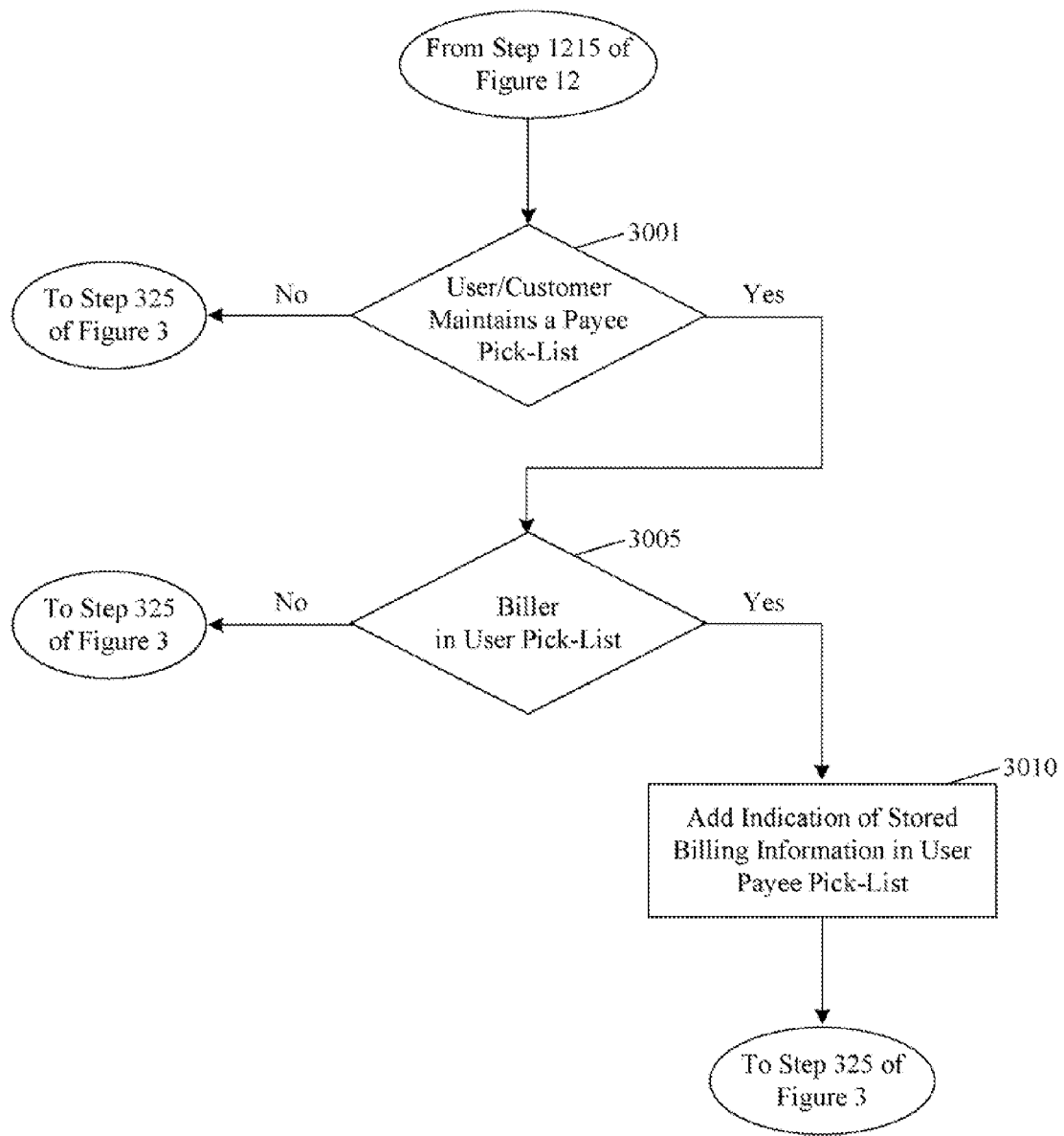
FIG. 30 is a flow chart showing operations performed by the network stations of FIG. 25 to determine if a new registered user/customer has included the biller in its payee pick-list.

Whenever central processor 140A adds a new registered user/customer to database 140B4, central processor 140A also determines if the new registered user/customer maintains a payee pick-list at central clearinghouse station 140. As depicted in FIG. 30 following step 1215 of FIG. 12, at step 3001 and via communication 2550, central processor 140A determines if the new registered user/customer maintains a payee pick-list. If the new registered user/customer does not have a payee pick-list, operations continue with step 325 of FIG. 3. On the other hand, if the new registered user/customer does have a payee pick-list, central processor 140A determines if the biller presenting the electronic bill is included in the individual payee pick-list at step 3005 and via communication 2555. If not, operations continue with step 325 of FIG. 3. If the biller is included in the individual payee pick-list, an indication is added to the individual payee pick-list that there is stored electronic billing information available, as depicted in step 3010 and communication 2560. Operations continue with step 325 of FIG. 3. Because central processor 140A determines, for each new entry into the registered user/customer database, if a customer maintains a payee pick-list and if that pick-list contains information identifying the payee electronically presenting the bill, central processor 140A is able to keep the electronic billing status information in each individual payee pick-list current.

Figure 31:
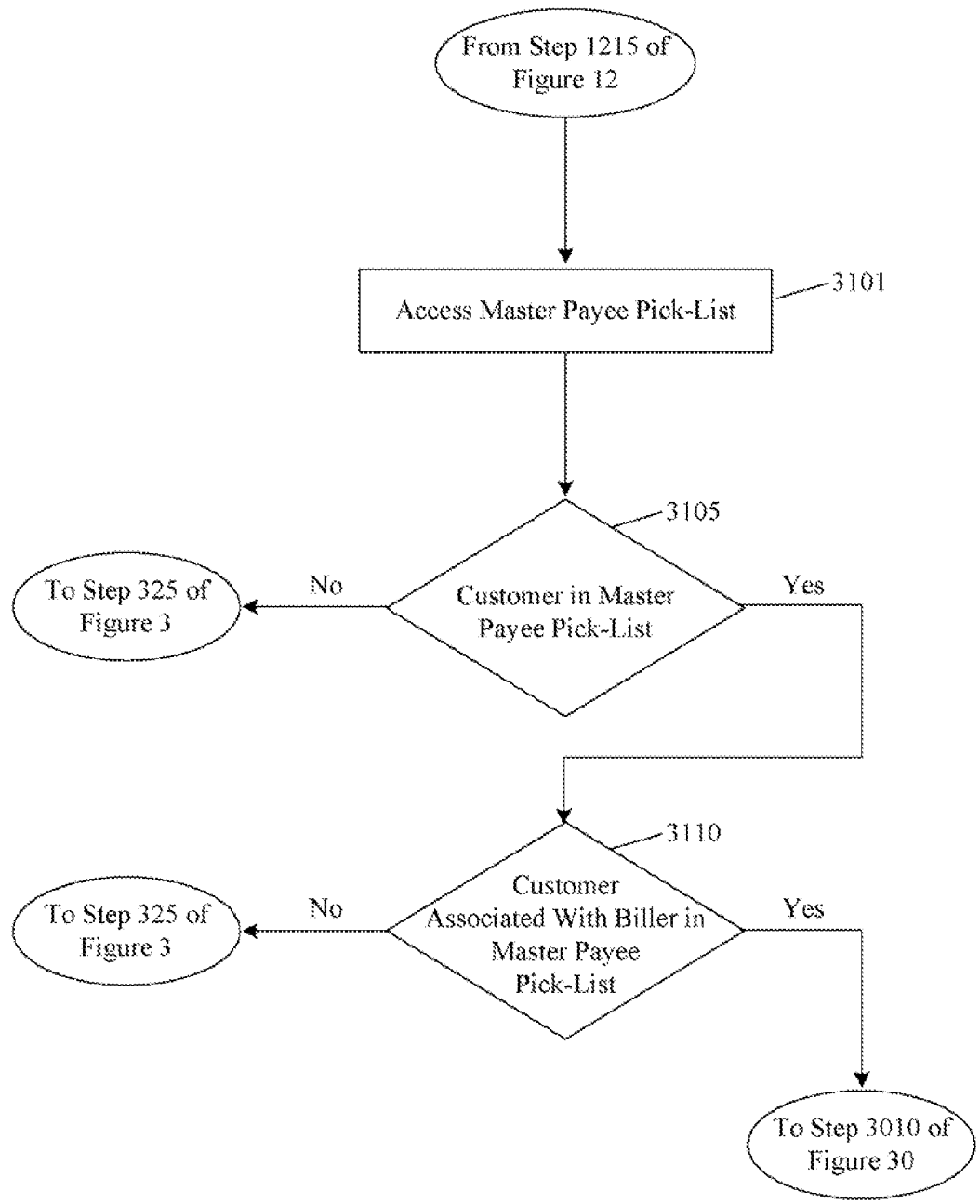
FIG. 31 is a flow chart showing alternative operations performed by the network stations of FIG. 25 to determine if a new registered user/customer has included the biller in its payee pick-list.

Central processor 140A can determine if each new entry into the registered user/customer database 140B4 maintains a payee pick-list and if the biller is included in the individual payee pick-list by accessing the master payee-pick list, as depicted in FIG. 31. The following processing replaces the processing depicted at steps 3001 and 3005 of FIG. 30. Central processor 140A accesses the master payee pick-list, as depicted in step 3101. The central processor 140A next determines if the new user/customer is included in the master payee pick-list, at step 3105. If not, operations continue with step 325 of FIG. 3. If the new user/customer is included in the master payee pick-list, central processor 140A determines if the customer is associated with the biller in the master payee-pick list, step 3110. If not, operations continue with step 325 of FIG. 3. If yes, operations continue with step 3010 of FIG. 30.

Because central processor 140A maintains user-class databases for not only registered users, but also for unregistered users, central processor 140A can notify a newly registered user of any existing stored billing information for the newly registered user.

Figure 32:
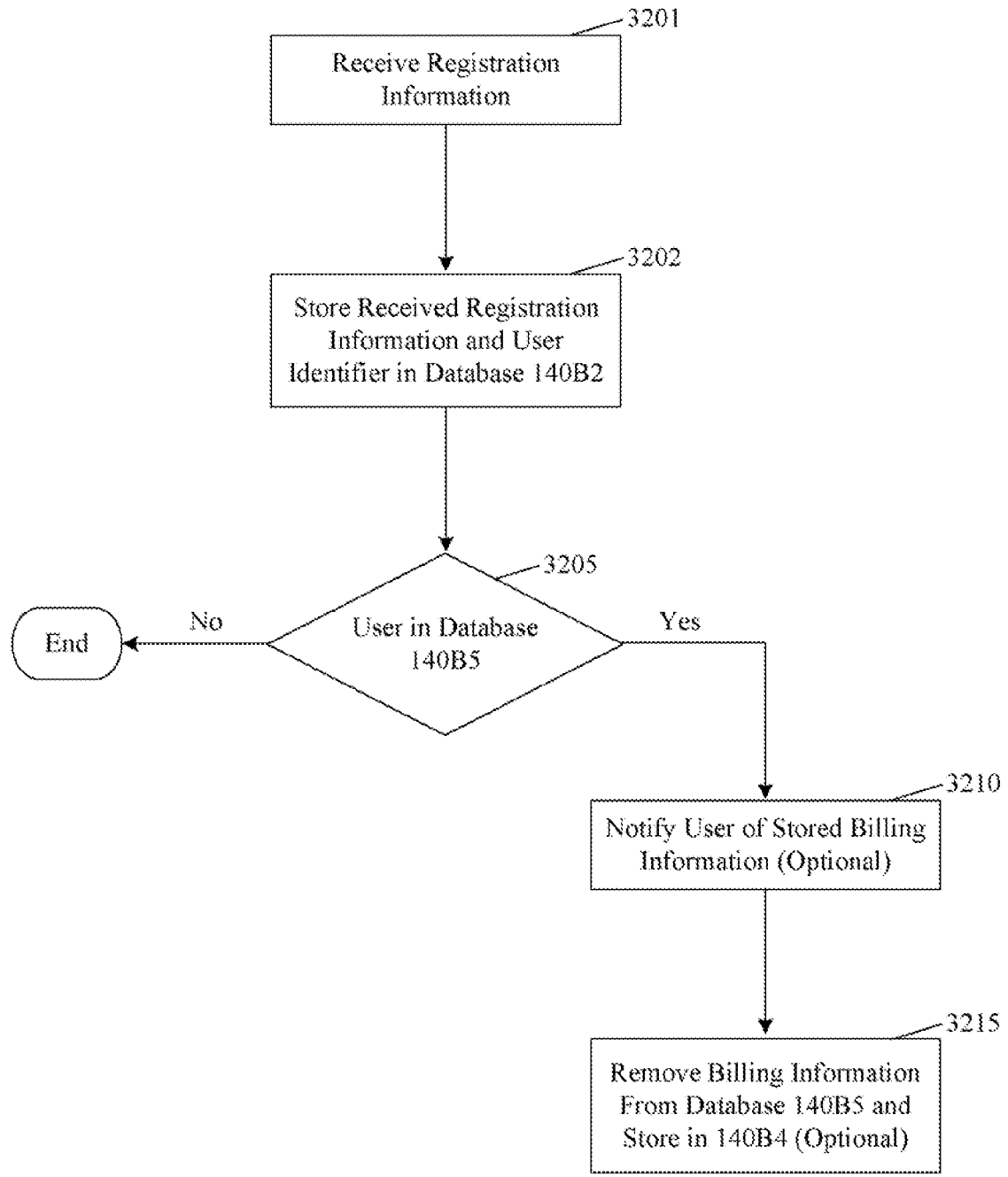
FIG. 32 is a flow chart showing operations performed by the network stations of FIG. 1 to register a previously unregistered user.

FIG. 32 depicts the steps necessary to inform a newly registered user of the existence of stored billing information. At step 3201, a central processor, such as central processor 140A shown in FIG. 1, receives registration information. This information, along with a user identifier, is stored in a relational database, such as database 140B2 illustrated in FIG. 1, as depicted in step 3202. Central station 140A accesses the unregistered user/customer database, which may be similar to database 140B5 shown in FIG. 1, as depicted in step 3205, and determines if the newly registered user is included in the database. If the new registered user is included in the database, the newly registered user is optionally notified of the stored billing information at step 3210. After optional notification, and at step 3215, the stored billing information is removed from the unregistered user/customer database 140B5 and stored in the registered user/customer database, which may be similar to database 140B4 shown in FIG. 1, keeping both the unregistered and registered user/customer databases current.

It will also be recognized by those skilled in the art that, while the invention has been described above in terms of one or more preferred embodiments, it is not limited thereto. Various features and aspects of the above described invention may be used individually or jointly. Further, although the invention has been described in the context of its implementation in a particular environment and for particular purposes, e.g. electronic bill presentment and/or payment, those skilled in the art will recognize that its usefulness is not limited thereto and that the present invention can be beneficially utilized in any number of environments and implementations. Accordingly, the claims set forth below should be construed in view of the full breath and spirit of the invention as disclosed herein.

I claim:

1. A method, comprising:
   executing computer-implemented instructions performed by one or more processors for:
   receiving, by a bill presentment and payment central clearinghouse, a request that is not associated with electronic bill presentment, the request comprising information identifying a payee of a payor, and the request comprising one of (i) a payment request or (ii) a request to add the payee to a pick list associated with the payor, wherein the payor has not previously activated electronic bill presentment from the payee through the clearinghouse;
   accessing, from at least one database by the clearinghouse utilizing at least a portion of the received information identifying the payee, stored billing information;
   identifying, by the clearinghouse from the accessed billing information, a bill presentment information associated with the payee;
   generating, by the clearinghouse, a notification of the identified bill presentment information associated with the payee; and
   transmitting, by the clearinghouse to the payor, the generated notification.

2. The method of claim 1, wherein identifying a bill presentment information associated with the payee comprises:
   matching the at least a portion of the received information identifying the payee to at least a portion of the billing information; and
   determining, subsequent to the matching, that the bill presentment information is available in the billing information.

3. The method of claim 1, wherein identifying a bill presentment information associated with the payee comprises identifying an indication that the payee is an electronic biller capable of providing electronic bill presentment to the payor through the clearinghouse.

4. The method of claim 3, further comprising executing computer-implemented instructions performed by the one or more processors for:

receiving, by the clearinghouse from the payor, a request to activate electronic bill presentment of bills for the payor from the payee through the clearinghouse; and initiating activation of electronic bill presentment in response to the received request.

5. The method of claim 4, wherein initiating activation of electronic bill presentment comprises:

transmitting, by the clearinghouse to the payee, a notification of the request to activate electronic bill presentment.

6. The method of claim 1, wherein identifying a bill presentment information associated with the payee comprises identifying an indication that an electronic bill from the payee for the payor is available through the clearinghouse.

7. The method of claim 6, further comprising executing computer-implemented instructions performed by the one or more processors for:

receiving, by the clearinghouse from the payor, a request to receive the electronic bill; and transmitting, by the clearinghouse to the payor, information associated with the electronic bill.

8. The method of claim 7, further comprising executing computer-implemented instructions performed by the one or more processors for:

transmitting, by the clearinghouse to the payee, a notification of the request to receive the electronic bill.

9. The method of claim 7, further comprising executing computer-implemented instructions performed by the one or more processors for:

receiving, by the clearinghouse from the payor, a request to pay the electronic bill; and remitting, by the clearinghouse to the payee, a payment for the electronic bill.

10. The method of claim 1, wherein the information identifying the payee comprises first information identifying the payee, and further comprising executing computer-implemented instructions performed by the one or more processors for:

identifying, by the clearinghouse, second information identifying the payee; and transmitting, by the clearinghouse to the payor, the second information identifying the payee, wherein the notification is transmitted to the payer with the second information identifying the payee.

11. The method of claim 1, further comprising executing computer-implemented instructions performed by the one or more processors for:

storing, by the clearinghouse in the at least one database, the information identifying the payee, wherein identifying a bill presentment information comprises identifying a bill presentment information (i) subsequent to storing the information identifying the payee, or (ii) prior to storing the information identifying the payee.

12. The method of claim 1, wherein the accessed billing information comprises first bill information, and further comprising executing computer-implemented instructions performed by the one or more processors for:

receiving, by the clearinghouse from the payee, second bill information associated with bills of the payee;

identifying, by the clearinghouse from at least a portion of the second bill information, an electronic bill of the payee that is available for the payor through the clearinghouse; and transmitting, by the clearinghouse to the payor, a notification of the available electronic bill of the payee.

13. The method of claim 12, wherein the second bill information is received subsequent to the receipt of the information identifying the payee.

14. The method of claim 1, wherein the identified bill presentment information comprises first bill presentment information, wherein the generated notification comprises a first notification, and further comprising executing computer-implemented instructions performed by the one or more processors for:

determining, by the clearinghouse, information identifying the payor;

accessing, from the at least one database by the clearinghouse utilizing at least a portion of the determined information identifying the payor, stored electronic billing information for the payor;

identifying, by the clearinghouse from the accessed electronic billing information for the payor, an electronic bill for the payor that is available to the payor through the clearinghouse;

generating, by the clearinghouse based at least in part on the identification of the electronic bill for the payor, a second notification of a second bill presentment information; and transmitting, by the clearinghouse to the payor, the second notification.

15. The method of claim 14, wherein the payee comprises a first payee, and wherein the identified electronic bill for the payor comprises an electronic bill that is a bill of a second payee different than the first payee.

16. The method of claim 15, wherein the generated second notification comprises an indication that the second payee is an electronic biller capable of providing electronic bill presentment to the payor through the clearinghouse.

17. The method of claim 15, wherein the generated second notification comprises an indication that the electronic bill from the second payee for the payor is available through the clearinghouse.

18. The method of claim 1, further comprising executing computer-implemented instructions performed by the one or more processors for:

storing an indication of the identified payee in the pick list associated with the payor.

19. The method of claim 18, wherein the pick list comprises multiple payees identified by the payor, and further comprising executing computer-implemented instructions performed by the one or more processors for:

transmitting, by the clearinghouse to the payor, a presentation of the pick list, wherein the presentation includes the generated notification of the bill presentment information.

20. A system, comprising:

a communications interface associated with a bill presentment and payment central clearinghouse and operable to (i) receive a request that is not associated with electronic bill presentment, the request comprising information identifying a payee of a payor, and the request comprising one of (a) a payment request or (b) a request to add the payee to a pick list associated with the payor, wherein the payor has not previously activated electronic bill presentment from the payee through the clearinghouse, and (ii) transmit a notification to the payor; and at least one processor associated with the clearinghouse and operable to (i) receive the information identifying the payee from the communications interface, (ii) access, from at least one database utilizing at least a portion of the information identifying the payee, stored billing information, (iii) identify, from the accessed billing information, a bill presentment information associated with the payee, (iv) generate the notification to the payee, the notification including the identified bill presentment information, and (v) direct the communications interface to transmit the notification to the payor.

21. The system of claim 20, wherein the processor is operable to identify the bill presentment information associated with the payee by:
matching the at least a portion of the received information identifying the payee to at least a portion of the billing information; and
determining, subsequent to the matching, that the bill presentment information is available in the billing information.

22. The system of claim 20, wherein the bill presentment information associated with the payee comprises an indication that the payee is an electronic biller capable of providing electronic bill presentment to the payor through the clearinghouse.

23. The system of claim 22, wherein:
the communications interface is further operable to receive, from the payor, a request to activate electronic bill presentment of bills for the payor from the payee through the clearinghouse; and
the at least one processor is further operable to initiate the activation of electronic bill presentment in response to the received request.

24. The system of claim 23, wherein the processor is further operable to direct the transmission, to the payee, of a notification of the request to activate electronic bill presentment.

25. The system of claim 20, wherein the bill presentment information associated with the payee comprises an indication that an electronic bill from the payee for the payor is available through the clearinghouse.

26. The system of claim 25, wherein:
the communications interface is further operable to receive, from the payor, a request to receive the electronic bill; and
the at least one processor is further operable to direct the transmission of information associated with the electronic bill to the payor.

27. The system of claim 26, wherein the at least one processor is further operable to direct the transmission of a notification of the request to receive the electronic bill to the payee.

28. The system of claim 26, wherein:
the communications interface is further operable to receive, from the payor, a request to pay the electronic bill; and
the at least one processor is further operable to direct the remittance, to the payee, of a payment for the electronic bill.

29. The system of claim 20, wherein:
the information identifying the payee is first information identifying the payee,
the at least one processor is further operable to identify second information identifying the payee, and
the communications interface is further operable to transmit, to the payor, the second information identifying the payee with the notification.

30. The system of claim 20, wherein the at least one processor is further operable to store, in the at least one database, the information identifying the payee, and
wherein the identification of the bill presentment information by the at least one processor occurs one of (i) subsequent to storing the information identifying the payee, or (ii) prior to the storing the information identifying the payee.

31. The system of claim 20, wherein:
the billing information includes first bill information,
the communications interface is further operable to receive, from the payee, second bill information associated with bills of the payee, and
the at least one processor is further operable to (i) identify, from the second bill information, an electronic bill of the payee that is available for the payor through the clearinghouse and (ii) direct the transmission, to the payor, of a notification of the available electronic bill of the payee.

32. The system of claim 31, wherein the second bill information associated with bills of the payee is received by the communications interface subsequent to the receipt of the information identifying the payee.

33. The system of claim 20, wherein:
the bill presentment information is a first bill presentment information,
wherein the notification is a first notification,
wherein the at least one processor is further operable to (i) determine information identifying the payor, (ii) access, from the at least one database utilizing at least a portion of the determined information identifying the payor, stored electronic billing information for the payor, (iii) identify, from the accessed electronic billing information for the payor, an electronic bill for the payor that is available to the payor through the clearinghouse, (iv) generate, based at least in part on the identification of the electronic bill for the payor, a second notification of a second bill presentment information, and (v) direct the transmission, to the payor, of the second notification.

34. The system of claim 33, wherein the payee is a first payee, and
wherein the electronic bill for the payor is a bill of a second payee different than the first payee.

35. The system of claim 34, wherein the second bill presentment information comprises an indication that the second payee is an electronic biller capable of providing electronic bill presentment to the payor through the clearinghouse.

36. The system of claim 34, wherein the second bill presentment information comprises an indication that the electronic bill from the second payee for the payor is available through the clearinghouse.

37. The system of claim 20, wherein the at least one processor is further operable to direct the storage of an indication of the identified payee in the pick list associated with the payor.

38. The system of claim 37, wherein:
the pick list comprises multiple payees identified by the payor,
the at least one processor is further operable to direct the communications interface to transmit a presentation of the pick list to the payor, and
the communications interface is further operable to transmit the presentation to the payor, wherein the presentation includes the generated notification.

39. The system of claim 38, wherein the presentation includes the bill presentment information.

40. A computer program product, comprising a computer usable medium having a computer readable program code embodied therein, the computer readable program code configured to be executed to facilitate:

receiving, by a bill presentment and payment central clearinghouse, a request that is not associated with electronic bill presentment, the request comprising information identifying a payee of a payor, and the request comprising one of (i) a payment request or (ii) a request to add the payee to a pick list associated with the payor, wherein the payor has not previously activated electronic bill presentment from the payee through the clearinghouse;

accessing, from at least one database by the clearinghouse utilizing at least a portion of the received information identifying the payee, stored billing information;

identifying, by the clearinghouse from the accessed billing information, a bill presentment information associated with the payee;

generating, by the clearinghouse, a notification of the identified bill presentment information associated with the payee; and transmitting, by the clearinghouse, to the payor, the generated notification.

41. The computer program product of claim 40, wherein the bill presentment information associated with the payee is identified by:

matching the at least a portion of the received information identifying the payee to at least a portion of the billing information; and determining, subsequent to the matching, that the bill presentment information is available in the billing information.

42. The computer program product of claim 40, wherein the bill presentment information associated with the payee is identified by identifying an indication that the payee is an electronic biller capable of providing electronic bill presentment to the payor through the clearinghouse.

43. The computer program product of claim 42, wherein the computer readable program code is further configured to be executed to facilitate:

receiving, by the clearinghouse from the payor, a request to activate electronic bill presentment of bills for the payor from the payee through the clearinghouse; and initiating activation of electronic bill presentment in response to the received request.

44. The computer program product of claim 43, wherein the computer readable program code is further configured to be executed to facilitate:

transmitting, by the clearinghouse to the payee, a notification of the request to activate electronic bill presentment.

45. The computer program product of claim 40, wherein the bill presentment information associated with the payee is identified by identifying an indication that an electronic bill from the payee for the payor is available through the clearinghouse.

46. The computer program product of claim 45, wherein the computer readable program code is further configured to be executed to facilitate:

receiving, by the clearinghouse from the payor, a request to receive the electronic bill; and transmitting, by the clearinghouse to the payor, information associated with the electronic bill.

47. The computer program product of claim 46, wherein the computer readable program code is further configured to be executed to facilitate:

transmitting, by the clearinghouse to the payee, a notification of the request to receive the electronic bill.

48. The computer program product of claim 46, wherein the computer readable program code is further configured to be executed to facilitate:

receiving, by the clearinghouse from the payor, a request to pay the electronic bill; and remitting, by the clearinghouse to the payee, a payment for the electronic bill.

49. The computer program product of claim 40, wherein the information identifying the payee comprises first information identifying the payee, and wherein the computer readable program code is further configured to be executed to facilitate:

identifying, by the clearinghouse, second information identifying the payee; and transmitting, by the clearinghouse to the payor, the second information identifying the payee, wherein the notification is transmitted to the payer with the second information identifying the payee.

50. The computer program product of claim 40, wherein the computer readable program code is further configured to be executed to facilitate:

storing, by the clearinghouse in the at least one database, the information identifying the payee, wherein the bill presentment information is identified (i) subsequent to storing the information identifying the payee, or (ii) prior to storing the information identifying the payee.

51. The computer program product of claim 40, wherein the accessed billing information comprises first bill information, and wherein the computer readable program code is further configured to be executed to facilitate:

receiving, by the clearinghouse from the payee, second bill information associated with bills of the payee;

identifying, by the clearinghouse from at least a portion of the second bill information, an electronic bill of the payee that is available for the payor through the clearinghouse; and transmitting, by the clearinghouse to the payor, a notification of the available electronic bill of the payee.

52. The computer program product of claim 51, wherein the second bill information is received subsequent to the receipt of the information identifying the payee.

53. The computer program product of claim 40, wherein the identified bill presentment information comprises first bill presentment information, wherein the generated notification comprises a first notification, and wherein the computer readable program code is further configured to be executed to facilitate:

determining, by the clearinghouse, information identifying the payor;

accessing, from the at least one database by the clearinghouse utilizing at least a portion of the determined information identifying the payor, stored electronic billing information for the payor;

identifying, by the clearinghouse from the accessed electronic billing information for the payor, an electronic bill for the payor that is available to the payor through the clearinghouse;

generating, by the clearinghouse based at least in part on the identification of the electronic bill for the payor, a second notification of a second bill presentment information; and transmitting, by the clearinghouse to the payor, the second notification.

54. The computer program product of claim 53, wherein the payee comprises a first payee, and wherein the identified electronic bill for the payor comprises an electronic bill that is a bill of a second payee different than the first payee.

55. The computer program product of claim 54, wherein the generated second notification comprises an indication that the second payee is an electronic biller capable of providing electronic bill presentment to the payor through the clearinghouse.

56. The computer program product of claim 54, wherein the generated second notification comprises an indication that the electronic bill from the second payee for the payor is available through the clearinghouse.

57. The computer program product of claim 40, wherein the computer readable program code is further configured to be executed to facilitate:

storing an indication of the identified payee in the pick list associated with the payor.

58. The computer program product of claim 57, wherein the pick list comprises multiple payees identified by the payor, and wherein the computer readable program code is further configured to be executed to facilitate:

transmitting, by the clearinghouse to the payor, a presentation of the pick list, wherein the presentation includes the generated notification of the bill presentment information.

59. A method, comprising:

executing computer-implemented instructions performed by one or more processors for: receiving, by a bill presentment and payment central clearinghouse, a request that is not associated with electronic bill presentment, the request comprising information identifying a payee of a payor, wherein the payor has not previously activated electronic bill presentment from the payee through the clearinghouse;

storing an indication of the identified payee in a payee pick list associated with the payor, the payee pick list comprising one or more payees identified by the payor;

accessing, from at least one database by the clearinghouse utilizing at least a portion of the received information identifying the payee, stored billing information;

identifying, by the clearinghouse from the accessed billing information, a bill presentment information associated with the payee;

generating, by the clearinghouse, a notification of the identified bill presentment information associated with the payee; and transmitting, by the clearinghouse to the payor, a presentation of the payee pick list, the presentation comprising the generated notification.

60. A system, comprising:

a communications interface associated with a bill presentment and payment central clearinghouse and operable to (i) receive a request that is not associated with electronic bill presentment, the request comprising information identifying a payee of a payor, wherein the payor has not previously activated electronic bill presentment from the payee through the clearinghouse, and (ii) transmit a presentation to the payor; and at least one processor associated with the clearinghouse and operable to (i) receive the information identifying the payee from the communications interface, (ii) store an indication of the identified payee in a payee pick list associated with the payor, the payee pick list comprising one or more payees identified by the payor, (iii) access, from at least one database utilizing at least a portion of the information identifying the payee, stored billing information, (iv) identify, from the accessed billing information, a bill presentment information associated with the payee, (v) generate the notification to the payee, the notification including the identified bill presentment information, and (vi) direct the communications interface to transmit the presentation, the presentation comprising the payee pick list and the generated notification.

* * * * *

(12) POST-GRANT REVIEW CERTIFICATE (21st)

United States Patent  
Ganesan

(10) Number: US 7,792,749 J1  
(45) Certificate Issued: May 3, 2016

(54) DYNAMIC BILLER LIST GENERATION

(75) Inventor: Ravi Ganesan

(73) Assignee: CHECKFREE SERVICES CORPORATION

Trial Number:

CBM2013-00032 filed Jun. 24, 2013

Petitioners: Metavante Corporation; Fidelity National Information Services, Inc.

Patent Owners: Checkfree Corporation; Checkfree Services Corporation; Checkfree Investment Corporation

Post-Grant Review Certificate for:

Patent No.: 7,792,749
Issued: Sep. 7, 2010
Appl. No.: 09/734,694
Filed: Dec. 13, 2000

The results of CBM2013-00032 are reflected in this post-grant review certificate under 35 U.S.C. 328(b).

POST-GRANT REVIEW CERTIFICATE
U.S. Patent 7,792,749 J1
Trial No. CBM2013-00032
Certificate Issued May 3, 2016

AS A RESULT OF THE POST-GRANT REVIEW PROCEEDING, IT HAS BEEN DETERMINED THAT:

Claims 1-60 are cancelled.

\* \* \* \* \*